United States Patent
Leimkuehler et al.

(10) Patent No.: US 11,224,153 B2
(45) Date of Patent: Jan. 18, 2022

(54) AGRICULTURAL IMPLEMENT AND ROW UNITS INCLUDING DOUBLE ACTING ACTUATOR SYSTEMS, METHODS, AND APPARATUS

(71) Applicant: Kinze Manufacturing, Inc., Williamsburg, IA (US)

(72) Inventors: Scott W. Leimkuehler, Williamsburg, IA (US); Steve Nolte, Williamsburg, IA (US); Robert Blackwell, Williamsburg, IA (US); Matthew Wilhelmi, Williamsburg, IA (US); David Schulte, Lincolnshire, IL (US); Paul Zinnel, St. Joseph, MO (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 557 days.

(21) Appl. No.: 16/047,236

(22) Filed: Jul. 27, 2018

(65) Prior Publication Data
US 2019/0029165 A1   Jan. 31, 2019

Related U.S. Application Data

(60) Provisional application No. 62/542,344, filed on Aug. 8, 2017, provisional application No. 62/538,309, filed on Jul. 28, 2017.

(51) Int. Cl.
*A01B 63/32* (2006.01)
*A01C 7/20* (2006.01)
(Continued)

(52) U.S. Cl.
CPC ............ *A01B 63/32* (2013.01); *A01B 63/008* (2013.01); *A01C 5/064* (2013.01); *A01C 7/205* (2013.01);
(Continued)

(58) Field of Classification Search
CPC ....... A01B 63/32; A01B 63/008; A01C 7/205; A01C 5/064
See application file for complete search history.

(56) References Cited

U.S. PATENT DOCUMENTS

| 4,176,721 | A | 12/1979 | Poggemiller et al. |
| 5,524,560 | A | 6/1996 | Carter |

(Continued)

FOREIGN PATENT DOCUMENTS

| CA | 2866045 A1 | 6/2015 |
| CA | 2866049 A1 | 6/2015 |

(Continued)

OTHER PUBLICATIONS

Kinze Manufacturing, Inc., PCT/US2018/044098 filed Jul. 27, 2018, "The International Search Report and the Written Opinion of the International Searching Authority, or the Declaration", 19 pages, dated Oct. 30, 2018.

*Primary Examiner* — Jamie L McGowan
(74) *Attorney, Agent, or Firm* — McKee, Voorhees & Sease PLC

(57) ABSTRACT

Agricultural planting implements, as well as other ground-engaging implements, can utilize supplemental force assemblies to provide up and/or down force at the row or rows of the implements. The force can be used to overcome changing field conditions, obstructions, as well as changing particulate amounts and weights carried by the rows of the implements, and the implement itself. The up force can be set at system pressure, or can include control valves at each of the row units to control the amount of up force provided. The down force can be controlled by control valves at each of the row units, and can be used to overcome the up pressure or provide a designated amount of down force to the row.

20 Claims, 25 Drawing Sheets

(51) Int. Cl.
  *A01B 63/00* (2006.01)
  *A01C 5/06* (2006.01)
  *F15B 11/00* (2006.01)
  *F15B 11/16* (2006.01)

(52) U.S. Cl.
  CPC ............ *F15B 11/003* (2013.01); *F15B 11/16* (2013.01); *F15B 2211/526* (2013.01); *F15B 2211/7053* (2013.01); *F15B 2211/71* (2013.01)

(56) References Cited

U.S. PATENT DOCUMENTS

| | | |
|---|---|---|
| 6,389,999 B1 | 5/2002 | Duello |
| 6,827,029 B1 | 12/2004 | Wendte |
| 7,028,554 B2 | 4/2006 | Adamchuk et al. |
| 7,360,495 B1 | 4/2008 | Martin |
| 7,401,561 B1 | 7/2008 | Kurz |
| 8,275,525 B2 | 9/2012 | Kowalchuk et al. |
| 8,327,780 B2 | 12/2012 | Bassett |
| 8,359,988 B2 | 1/2013 | Bassett |
| 8,448,717 B2 | 5/2013 | Adams et al. |
| 8,469,114 B1 | 6/2013 | Borkgren |
| 8,522,889 B2 | 9/2013 | Adams et al. |
| 8,544,397 B2 | 10/2013 | Bassett |
| 8,544,398 B2 | 10/2013 | Bassett |
| 8,550,020 B2 | 10/2013 | Sauder et al. |
| 8,573,319 B1 | 11/2013 | Casper et al. |
| 8,634,992 B2 | 1/2014 | Sauder et al. |
| 8,636,077 B2 | 1/2014 | Bassett |
| 8,763,713 B2 | 7/2014 | Bassett |
| 8,776,702 B2 | 7/2014 | Bassett |
| RE45,091 E | 8/2014 | Bassett |
| 8,794,344 B2 | 8/2014 | Blunier et al. |
| 8,826,836 B2 | 9/2014 | Van Buskirk et al. |
| 8,827,001 B2 | 9/2014 | Wendte et al. |
| 8,843,269 B2 | 9/2014 | Anderson et al. |
| 8,863,857 B2 | 10/2014 | Bassett |
| 8,909,436 B2 | 12/2014 | Achen et al. |
| 8,910,581 B2 | 12/2014 | Bassett |
| 8,910,582 B2 | 12/2014 | Mariman et al. |
| 8,935,986 B2 | 1/2015 | Blomme et al. |
| 8,985,232 B2 | 3/2015 | Bassett |
| 9,055,712 B2 | 6/2015 | Bassett |
| 9,107,337 B2 | 8/2015 | Bassett |
| 9,107,338 B2 | 8/2015 | Bassett |
| 9,137,939 B2 | 9/2015 | Winick et al. |
| 9,148,989 B2 | 10/2015 | Van Buskirk et al. |
| 9,192,091 B2 | 11/2015 | Bassett |
| 9,215,838 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin et al. |
| 9,282,689 B2 | 3/2016 | Van Buskirk et al. |
| 9,288,937 B2 | 3/2016 | Sauder et al. |
| 9,307,690 B2 | 4/2016 | Bassett |
| 9,462,740 B2 | 10/2016 | Buelow |
| 9,462,744 B2 | 10/2016 | Isaacson |
| 9,485,900 B2 | 11/2016 | Connell et al. |
| 9,511,633 B2 | 12/2016 | Anderson et al. |
| 9,615,497 B2 | 4/2017 | Bassett et al. |
| 9,668,398 B2 | 6/2017 | Bassett |
| 9,675,004 B2 | 6/2017 | Landphair et al. |
| 9,693,496 B2 | 7/2017 | Tevs et al. |
| 9,723,778 B2 | 8/2017 | Bassett |
| 9,743,578 B2 | 8/2017 | Blomme et al. |
| 9,801,332 B2 | 10/2017 | Landphair et al. |
| 9,826,677 B2 | 11/2017 | Gervais et al. |
| 9,848,522 B2 | 12/2017 | Bassett |
| 9,943,027 B2 | 4/2018 | Sauder et al. |
| 10,010,025 B2 | 7/2018 | Dienst et al. |
| 2003/0019408 A1 | 1/2003 | Fraisse et al. |
| 2003/0101626 A1 | 6/2003 | Johnson |
| 2005/0120928 A1 | 6/2005 | Horn |
| 2005/0155536 A1 | 7/2005 | Wendte et al. |
| 2006/0065412 A1 | 3/2006 | Bauer |
| 2006/0131040 A1 | 6/2006 | Barber |
| 2006/0213407 A1 | 9/2006 | Sauder et al. |
| 2008/0011208 A1 | 1/2008 | Martin |
| 2009/0090521 A1 | 4/2009 | Moyna |
| 2009/0175235 A1 | 7/2009 | Spinar et al. |
| 2009/0266279 A1 | 10/2009 | Dillman |
| 2010/0180695 A1 | 7/2010 | Sauder et al. |
| 2010/0198529 A1 | 8/2010 | Sauder et al. |
| 2011/0005784 A1 | 1/2011 | Landoll et al. |
| 2011/0120357 A1 | 5/2011 | Schilling et al. |
| 2011/0228870 A1 | 9/2011 | Lastinger et al. |
| 2012/0017813 A1 | 1/2012 | Van Buskirk et al. |
| 2012/0060730 A1* | 3/2012 | Bassett ................ A01B 63/111 111/149 |
| 2012/0151910 A1* | 6/2012 | Sauder ................ A01B 63/008 60/459 |
| 2012/0186503 A1* | 7/2012 | Sauder .................. A01B 63/22 111/134 |
| 2013/0032362 A1 | 2/2013 | Rylander |
| 2013/0046418 A1 | 2/2013 | Anderson |
| 2013/0247802 A1 | 9/2013 | Truax et al. |
| 2014/0000919 A1 | 1/2014 | Bachman et al. |
| 2014/0026748 A1* | 1/2014 | Stoller ................... A01C 5/064 91/418 |
| 2014/0116735 A1* | 5/2014 | Bassett ................ A01B 63/008 172/2 |
| 2014/0277959 A1 | 9/2014 | Wagers et al. |
| 2015/0264857 A1 | 9/2015 | Achen et al. |
| 2015/0271986 A1* | 10/2015 | Sauder ................ A01B 63/008 172/2 |
| 2015/0289438 A1 | 10/2015 | Sauder et al. |
| 2015/0373901 A1* | 12/2015 | Bassett ................ A01B 61/044 172/1 |
| 2016/0044857 A1 | 2/2016 | Sporrer et al. |
| 2016/0128265 A1 | 5/2016 | Bassett |
| 2016/0338257 A1* | 11/2016 | Sauder ................ A01B 73/065 |
| 2017/0094889 A1 | 4/2017 | Garner et al. |
| 2017/0215329 A1* | 8/2017 | Lacher ................ F15B 13/0402 |
| 2020/0154627 A1* | 5/2020 | Plattner .................. A01B 63/32 |
| 2020/0315081 A1* | 10/2020 | Plattner .................. A01B 63/32 |
| 2020/0337207 A1* | 10/2020 | Anderson ............. F15B 13/044 |

FOREIGN PATENT DOCUMENTS

| | | |
|---|---|---|
| CN | 103640815 A | 3/2014 |
| CN | 105103722 A | 12/2015 |
| EA | 011070 B1 | 12/2008 |
| EP | 1052890 A1 | 11/2000 |
| EP | 1594355 B1 | 11/2005 |
| EP | 1974596 A1 | 10/2008 |
| EP | 2353354 A1 | 8/2011 |
| EP | 2497348 A1 | 9/2012 |
| EP | 2554036 A1 | 2/2013 |
| EP | 2497348 B1 | 3/2014 |
| EP | 2717667 A2 | 4/2014 |
| EP | 3259972 A1 | 12/2017 |
| RU | 2454058 C1 | 6/2012 |
| SU | 502622 A1 | 2/1976 |
| WO | 2009134144 A1 | 11/2009 |
| WO | 2009149473 A2 | 12/2009 |
| WO | 2010056834 A1 | 5/2010 |
| WO | 2011161140 A1 | 12/2011 |
| WO | 2012149367 A1 | 11/2012 |
| WO | 2012149415 A1 | 11/2012 |
| WO | 2013025898 A1 | 2/2013 |
| WO | 2013049198 A1 | 4/2013 |
| WO | 2014026183 A2 | 2/2014 |
| WO | 2014066650 A1 | 5/2014 |
| WO | 2015031840 A1 | 3/2015 |
| WO | 2017197274 A1 | 11/2017 |
| WO | 2018075788 A1 | 4/2018 |

* cited by examiner

AGRICULTURAL IMPLEMENT AND ROW UNITS INCLUDING DOUBLE ACTING ACTUATOR SYSTEMS, METHODS, AND APPARATUS

CROSS-REFERENCE TO RELATED APPLICATIONS

This claims priority under 35 U.S.C. § 119 to provisional application Ser. No. 62/538,309, filed Jul. 28, 2017, and to provision application Ser. No. 62/542,344, filed Aug. 8, 2017. These patent applications are herein incorporated by reference in their entirety, including without limitation, the specification, claims, and abstract, as well as any figures, tables, or drawings thereof.

FIELD OF THE DISCLOSURE

The disclosure is related generally to the field of agricultural implements. More particularly, but not exclusively, the disclosure includes aspects related to double acting cylinder arrangements on row units of agricultural implements for providing both up and down force to the row unit.

BACKGROUND OF THE INVENTION

An agricultural row crop planter is a machine built for precisely distributing seed into the ground. The row crop planter generally includes a horizontal toolbar fixed to a hitch assembly for towing behind a tractor or other implement. Row units including seed meters are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing, a seed disc, and a seed chute. The housing is constructed such that it creates a reservoir to hold a seed pool. The seed disc resides within the housing and rotates about a generally horizontal central axis. As the seed disc rotates, it passes through the seed pool where it picks up individual seeds. The seeds are subsequently dispensed into the seed chute where they drop into the seed furrow.

As the agricultural planter row unit travels across fields with variable soil types, soil moisture, residue levels and topography, as well as the change in weight of components on or at row units, it can be difficult to maintain constant seed depth and other parameters due to changing conditions which would ideally require varying the row unit down force pressure. For example, farming with higher residue levels also requires higher row unit down force levels as row cleaners, coulters and other attachments require applied force to keep them in the ground and at consistent depths.

At the same time, in many locations there are immovable rocks or other obstructions at or below the soil surface which require the planter row unit to be able to quickly and freely (without undue increase in the row unit down force) rise up and over the obstruction freely and then quickly move back down, leaving a minimum amount of the row unplanted or not planted at the correct or desired depth. All this must be accomplished at continually increasing ground speeds.

Traditionally, springs have been used to urge row units downward. Air bag systems have also been used to overcome some of the drawbacks to mechanical spring systems. Air systems provide a more uniform down force through the vertical range of travel, compared to springs, and are somewhat easier to adjust than springs. However due to the compressibility of air and the relatively large volumes required, changes in air pressure are very cumbersome and not adaptable to very fast change and response to in-cab controls on the go. Air bag systems typically have a very large cross-sectional area in relation to the hose feeding the air spring with pressure, which can provide a large multiplication of force and allow for relatively good isolation of one row unit relative to another. However, air bag systems typically do not allow for rapid change of the force being applied, because of the large volume of the air spring in relation to the cross section of the hose supplying the air. Furthermore, as computers and GPS systems have allowed crop production to be managed in a location-specific way as an implement moves through the field, it has become necessary to achieve more rapid changes in the setting or adjustment of the implement. In the case of a planter row unit, it is also necessary to generate a large amount of force. Each individual planter row unit must be able to react to the soil it encounters independently of the other row units.

Therefore, there is a need in the art for improved apparatuses, systems, and/or methods for providing up and down force at the row units in a way that provides for a sufficient amount of force for varying types of row units, while also providing a near instantaneous response to variations in soil conditions, obstructions, and other changes in a field being planted.

SUMMARY OF THE INVENTION

It is therefore a primary feature, object, and/or advantage of the disclosure to overcome or improve on the issues in the field of art.

It is another object, feature, and/or advantage to provide a system providing both up and downforce for a row unit of an agricultural implement.

It is still another object, feature, and/or advantage that includes a double acting hydraulic cylinder that is connected to a row unit.

It is yet another object, feature, and/or advantage to provide a system than can be manually or automatically adjusted to adjust the amount of up and/or down force applied to a row unit.

These and/or other objects, features, and advantages of the present invention will be apparent to those skilled in the art. The present invention is not to be limited to or by these objects, features and advantages. No single embodiment need provide each and every object, feature, or advantage.

According to some aspects of the invention, an assembly for providing up and/or down force for a row unit of an agricultural implement having a plurality of row units is provided, and includes a double acting cylinder including a first chamber and a second chamber, wherein said cylinder configured to provide a downforce to an agricultural row unit when activated in the first chamber, and wherein an up force is provided to the agricultural row unit with the second chamber at a system pressure; a manifold in communication with said cylinder; and a pressure control valve coupled to the manifold and in communication with the cylinder. The manifold and pressure control valve are divorced from the double acting cylinder.

A shutoff valve can be operatively connected to the second chamber each of the double acting cylinders at each of the row units to shut off the system pressure being applied to the second chambers.

The control valve comprises a down force control valve for controlling the down force at the row unit, and a separate up force control valve for controlling the up force at the row unit.

The down force control valve can be an electrically controlled solenoid.

A shutoff valve operatively can be connected to the second chamber each of the double acting cylinders at each of the row units to shut off the system pressure being applied to the second chambers.

The up force control valve can be an electrically controlled solenoid.

Added pressure can be applied to the first chamber to overcome the system pressure to provide downforce to the row units.

A control unit can be added at each row unit to control the added pressure.

The added pressure can be controlled via a tractor.

According to additional aspects of the invention, an assembly for providing up and/or down force to a row unit of an agricultural planter having a plurality of row units is provided, and includes a double acting cylinder including a first chamber on a first side of a piston and a second chamber on a rod side of the piston, wherein said cylinder configured to provide an up force at a system pressure by providing said system pressure to the second chamber of the cylinder; a manifold in communication with said cylinder; and a pressure control valve coupled to the manifold and in communication with the cylinder to control the amount of pressure applied to the first chamber. The manifold and pressure control valve are supported by a toolbar of the agricultural implement.

According to some embodiments, the assembly includes an accumulator at the pressure control valve to receive an amount of fluid when pressure is applied at the second chamber.

According to still additional aspects of the invention, a system for providing up and/or down force to a row unit of an agricultural implement is provided, and includes a double acting cylinder including a first chamber on a first side of a piston and a second chamber on a rod side of the piston, wherein said cylinder configured to provide an up force at a system pressure by providing said system pressure to the second chamber of the cylinder; a manifold in communication with said cylinder; and a pressure control valve coupled to the manifold and in communication with the cylinder to control the amount of pressure applied to the first chamber. The second chamber of the double acting cylinder can be substantially at the system pressure to provide the up force, and added pressure being applied to the first chamber to overcome the system pressure.

Figure 1:
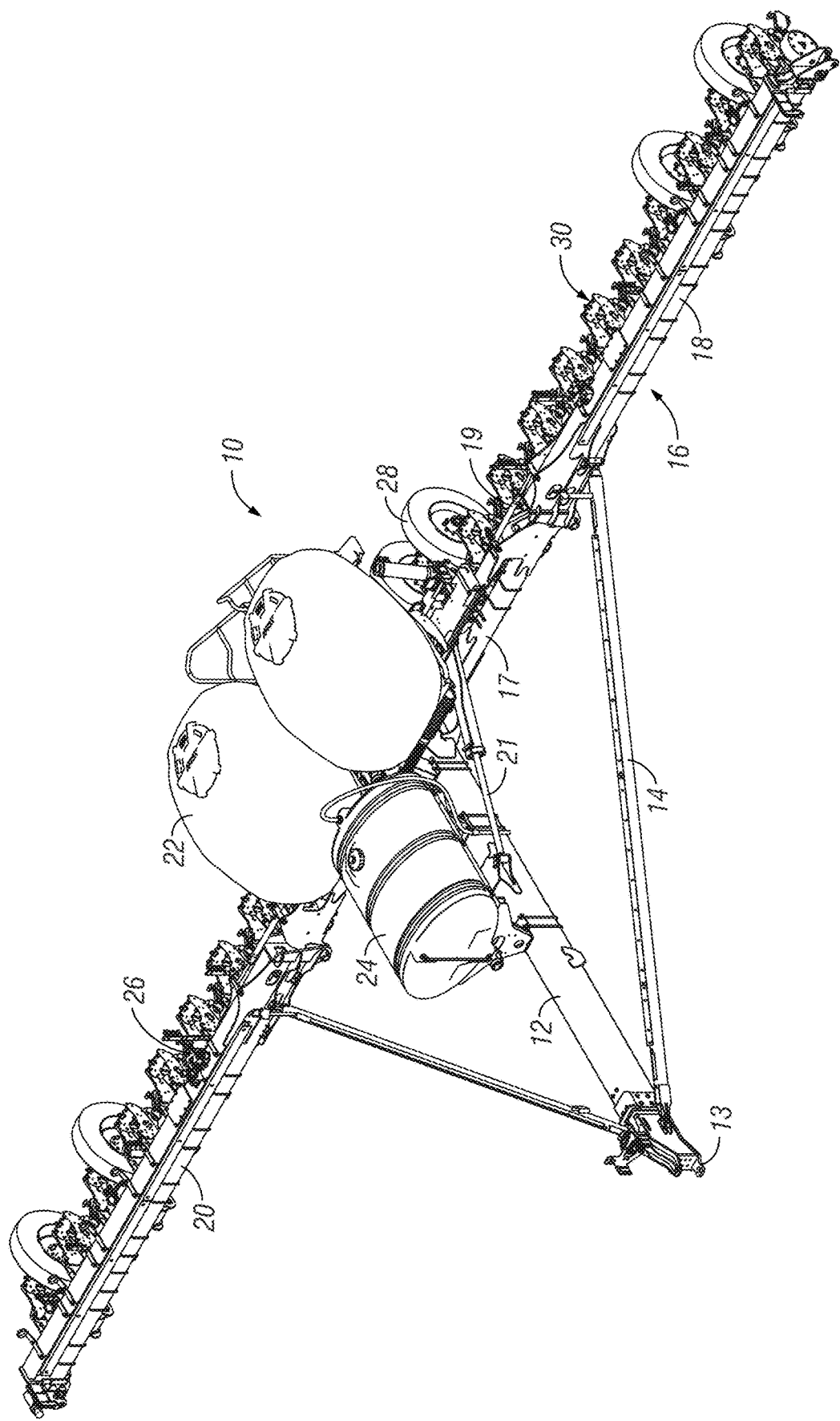
FIG. 1 is a perspective view of an agricultural planting implement.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 is a perspective view of an agricultural implement. The agricultural implement 10 as shown in FIG. 1 is also known as a planter or planting unit. The agricultural planter 10 as shown in the figure is used to plant one or more types of crop in a field. For example, the planter 10 may be a precision planting implement that is used to place seed with precision in a field to be most efficient and to optimize growing conditions for the planted seed types in the field. However, the implement may be generally any implement used in precision farming. The planter 10 as shown in FIG. 1 includes a tongue 12 including a hitch 13 at a first end thereof. The hitch is used generally to attach to a tractor or other tow vehicle (not shown). The tongue generally extends in the direction of travel of the tow vehicle. At an opposite end of the tongue 12 is a toolbar 16. The toolbar shown in FIG. 1 extends generally perpendicular to the tongue 12 when in a planting configuration. Connecting the toolbar 16 and the tongue 12 are draft links 14. The draft links 14 can be used to maintain the perpendicular configuration of the toolbar 16 relative to the tongue 12 while in a planting position. Furthermore, the tongue may be a telescoping type tongue such that the planter 10 is a front folding planter unit. As shown in FIG. 1, one or more folding cylinders 21 may be connected between the toolbar 16 and the tongue 12 and can be extended or retracted to move the implement 10 between the field configuration as shown in FIG. 1 and a transport configuration, wherein generally the toolbar 16, or parts thereof, are substantially parallel to the tongue 12. The exact configuration of the planting unit 10 is not to be limiting on the invention of the disclosure herein.

The toolbar 16, depending on the width of the implement, may include sections. As shown in FIG. 1, the toolbar 16 may include a center toolbar section 17, along with first and second wings sections or wing toolbar sections 18, 20 extending from opposite sides of the central toolbar section 17. The sections or wings 18, 20 of the toolbar 16 allow for the planter to be folded in a frontward or upright manner for transport. However, the exact nature of the toolbar is also not to be limiting to the invention of the present disclosure. For example, it is also contemplated that the toolbar could be a lift and rotate style planter, or the like. Also shown in the Figure are one or more wing down pressure cylinders 19. The wing down pressure cylinders 19 are positioned generally at the location where the wings extend from the central toolbar. The wing down pressure cylinder 19 can be used to maintain a down pressure at the wings and also to lift the wings when needed.

Additionally, as part of the planter 10, one or more bulk seed tanks 22, as well as a fertilizer tank 24 can be included. The contents of both the seed and/or fertilizer tanks 22, 24 can be delivered to individual row units via an air seed delivery system or other delivery system. This will allow the weight to be maintained generally at the locations of the tanks. However, it should also be appreciated that the row units include row unit hoppers instead of utilizing bulk fill, wherein the row unit hoppers include seed and/or fertilizer. However, the weights of the hoppers at the row units also affect down force and/or down pressure. Also shown in the Figure are a plurality of wheels 28 and a plurality of fans 26. The fans 26 can be utilized to aid in the air delivery system for the hoppers, and can also provide for pressure differentials for seed meters of row units 30. The wheels 28 can be used to transport the planter and to allow for easier movement through a field. A plurality of ground engaging members in the form of row units 30 are connected to the toolbar 16 and are utilized for performing an agricultural operation (e.g., planting, seeding, drilling, tilling, etc.).

Figure 2:
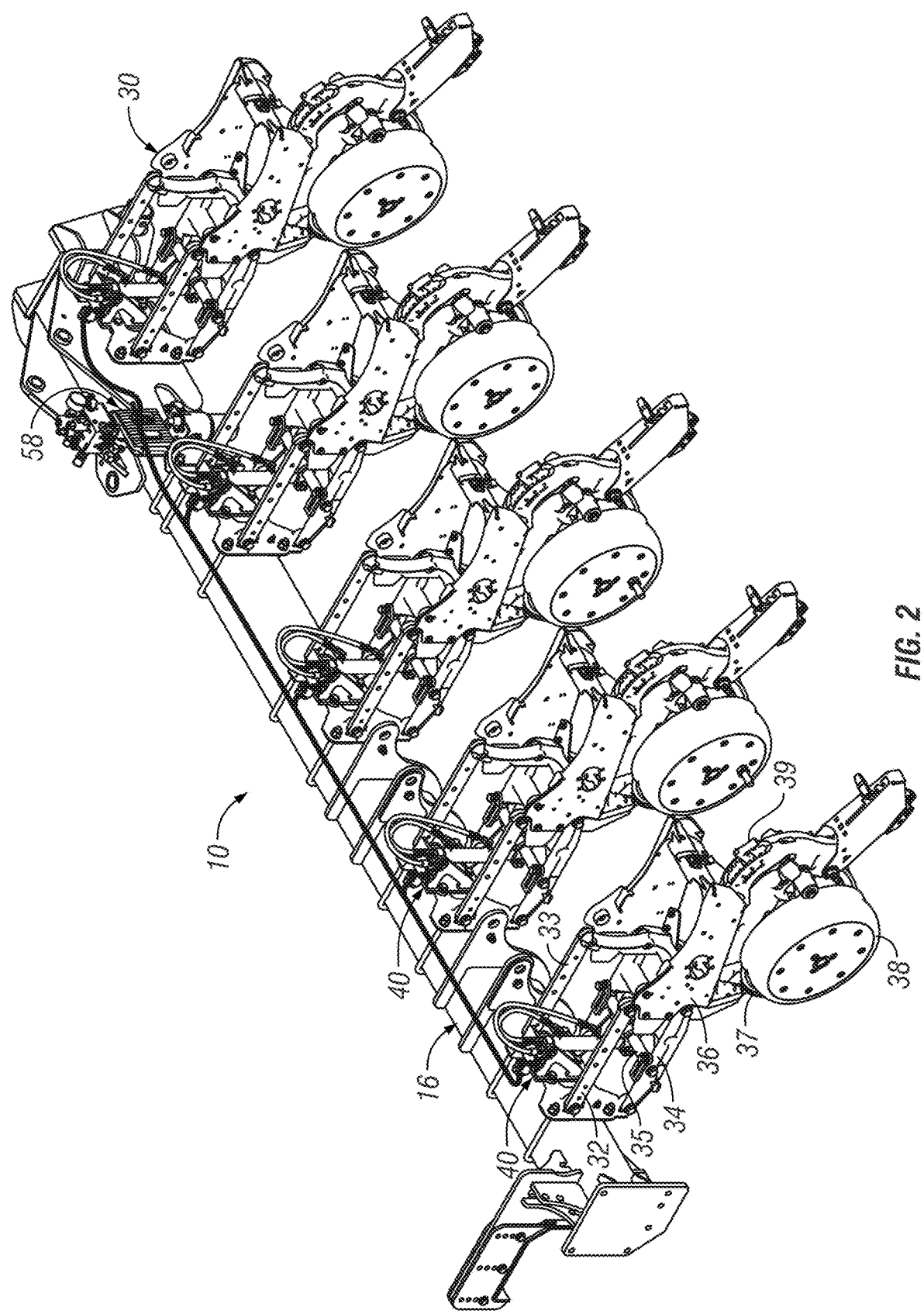
FIG. 2 is a perspective view of a selected number of row units attached to a toolbar of an agricultural planting implement.

FIG. 2 is an enlarged view of a portion of the planter 10. The figure shows a section of the toolbar 16 including a number of row units 30 attached thereto. As shown in FIG. 1, a number of row units 30 will be positioned along the length of the toolbar, including the sections thereof. The row units can take many forms, and can be ground engaging. Examples of row units for use with the implement can be tilling units, planting units, seeders, drills, or the like. This should not be seen to be an exhaustive list, and generally and ground-engaging tools should be considered to be part of the present disclosure. The row units 30 could include multiple members for performing multiple agricultural operations, as well. The invention of the present disclosure is not to be limited to the exact configurations or to that listed herein, and is to be contemplated to include generally any type of ground engaging unit as may be known and/or used for agricultural operations. The row units 30 are connected to the tool bar 16, such as via the parallel linkage, such that the row units are generally supported by the toolbar 16 (however, they will also be self-supporting in some manner when in contact with the ground or otherwise ground-engaging). A linkage 32 can be used to connect between a mount 31, which is connected to the toolbar 16, and a frame portion 36 of the row unit 30. The linkage 32 as shown in the figures includes upper bars 33 and lower bars 34. The four-bar linkage 32 allows for some vertical movement of the row unit 30 relative to the toolbar 16, and vice versa, as the planter 10 moves through a field. In addition, it should be appreciated that additional types and/or configurations of linkages and/or other connection components to allow for such vertical movement of the row unit 30 relative to toolbar 16 can be included as part of the components disclosed herein, and are to be considered a part of the invention disclosed herein. Furthermore, in some instances, the linkage may be set or configurable to prevent movement of the row unit 30 in relation to the toolbar 16, in a temporary or permanent basis.

The row unit 30 includes a frame 36. An opener wheel or wheels 37 is connected to the frame. The opener wheels or other opening members (wheels, coulter, shank, etc.) are penetrated into the ground to create a furrow for depositing a seed therein. For example, the figures do not disclose a seed meter or meters at the row unit 30. However, as shown in co-owned U.S. Pat. Nos. 9,282,691 and 9,622,402, herein incorporated by reference in their entirety, seed meters can be utilized with a furrow opener 37 to deposit seeds in a controlled manner to allow for spacing therebetween to provide for optimal growing conditions. The opener sets the depth of placing the seeds, and can be controlled, as will be understood. One or more depth setting members, such as gauge wheels 38, can be included as part of the row unit 30 to aid and control the depth of the furrow created by the opening member 37. An adjustment member 39 is also included in the row units 30 as is shown in the figures, and can be utilized to adjust the depth of the opening member 37 relative to a closing system and/or gauge member 38. Therefore, the depth of the furrow can be adjusted either manually (e.g., mechanically) or electronically, such as manually or automatically, to provide for a consistent or chosen depth for planting the seed in a field. Such manners of controlling can be found in co-owned U.S. patent application Ser. No. 13/457,577, filed Apr. 27, 2012; Ser. No. 13/457,815, filed on Apr. 27, 2012; and Ser. No. 13/458,012, filed Apr. 27, 2012, with the contents of all being incorporated by reference in their entirety and for all purposes.

However, as field conditions may change dependent on a number of conditions, the depth may not always be set in the furrow. For example, field conditions such as soil types, soil makeup, obstructions, and the like may affect the ability to maintain a desired furrow depth by a row unit. Therefore, aspects of the present disclosure include the addition of an up and/or down force assembly 40 (also referred to as a supplemental force assembly, cylinder assembly, actuator assembly, downforce assembly, or the like) operatively connected to the row units 30 and the toolbar 16. Each row unit can be operatively connected to a force assembly 40 via the linkage 32. While the term "down force assembly" is commonly used herein, it is to be appreciated that the down force assembly 40 can be utilized to provide both down and up forces to the row units 30 and generally relative to the tool bar 16. As will be understood, a down force is a net force acting generally downward or towards the field, as evidenced by the row unit, while an up force is the opposite in that it is a net force in an upward manner away from the field. The force applied to the row unit 30 can aid in maintaining the desired depth in the furrows created by the components of the row units 30. Thus, in more compact soil conditions, for example, the amount of down force may need to be increased in order to press the opening member 37 with more force into the ground such that the desired depth of furrow created by the opening member is maintained at or near the desired depth. However, the ability to provide up force by the down force assembly 40 will also will allow for the row unit to be generally lifted or else relieved of its weight. This can be used when there is to be less weight than the row units themselves being needed by the field or other ground conditions, or even when the row units are to be lifted from the ground.

Figures 3A, 3B:
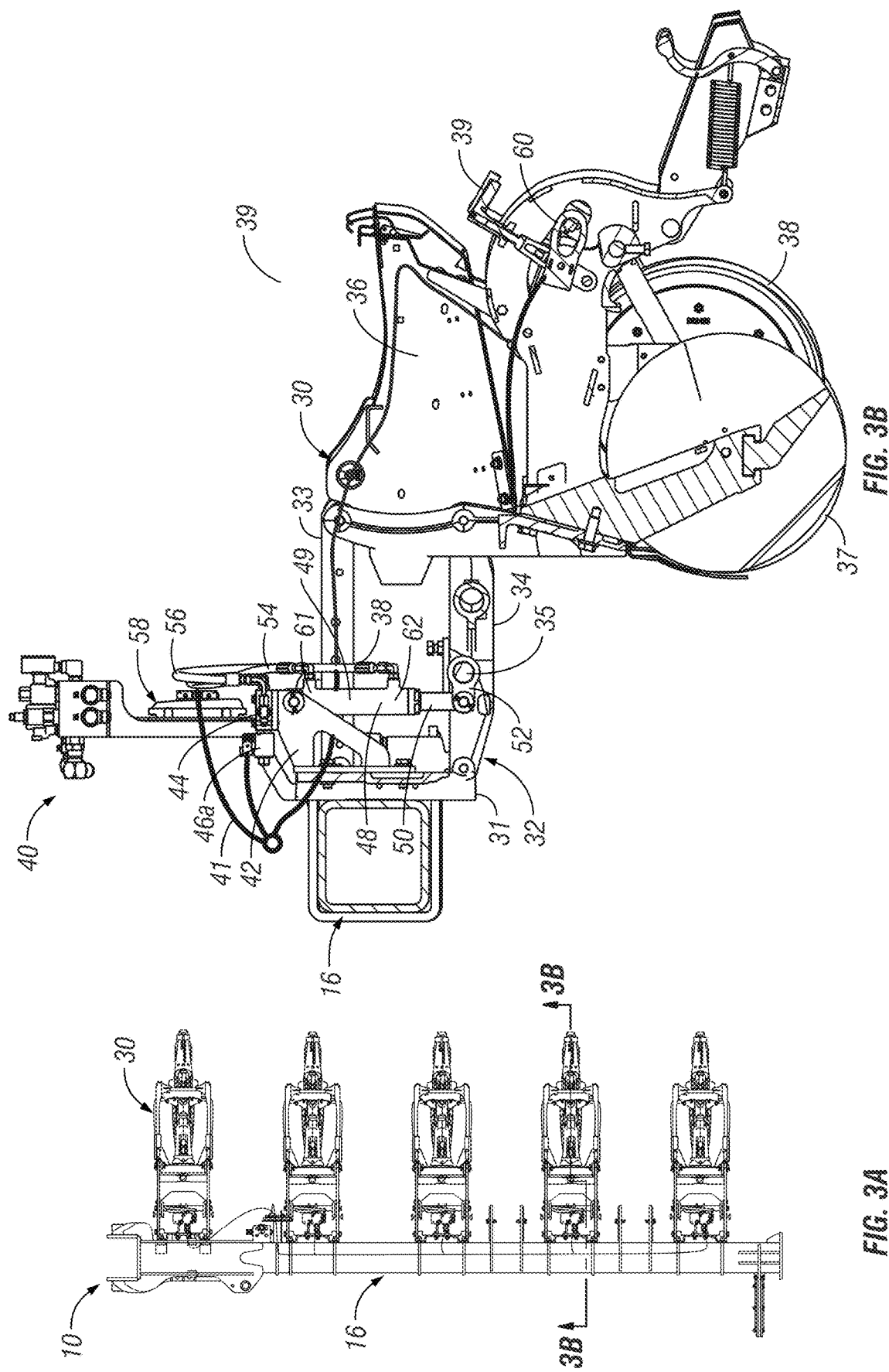
FIGS. 3A and 3B are top planar and sectional views of a row unit attached to a toolbar.
Figure 4:
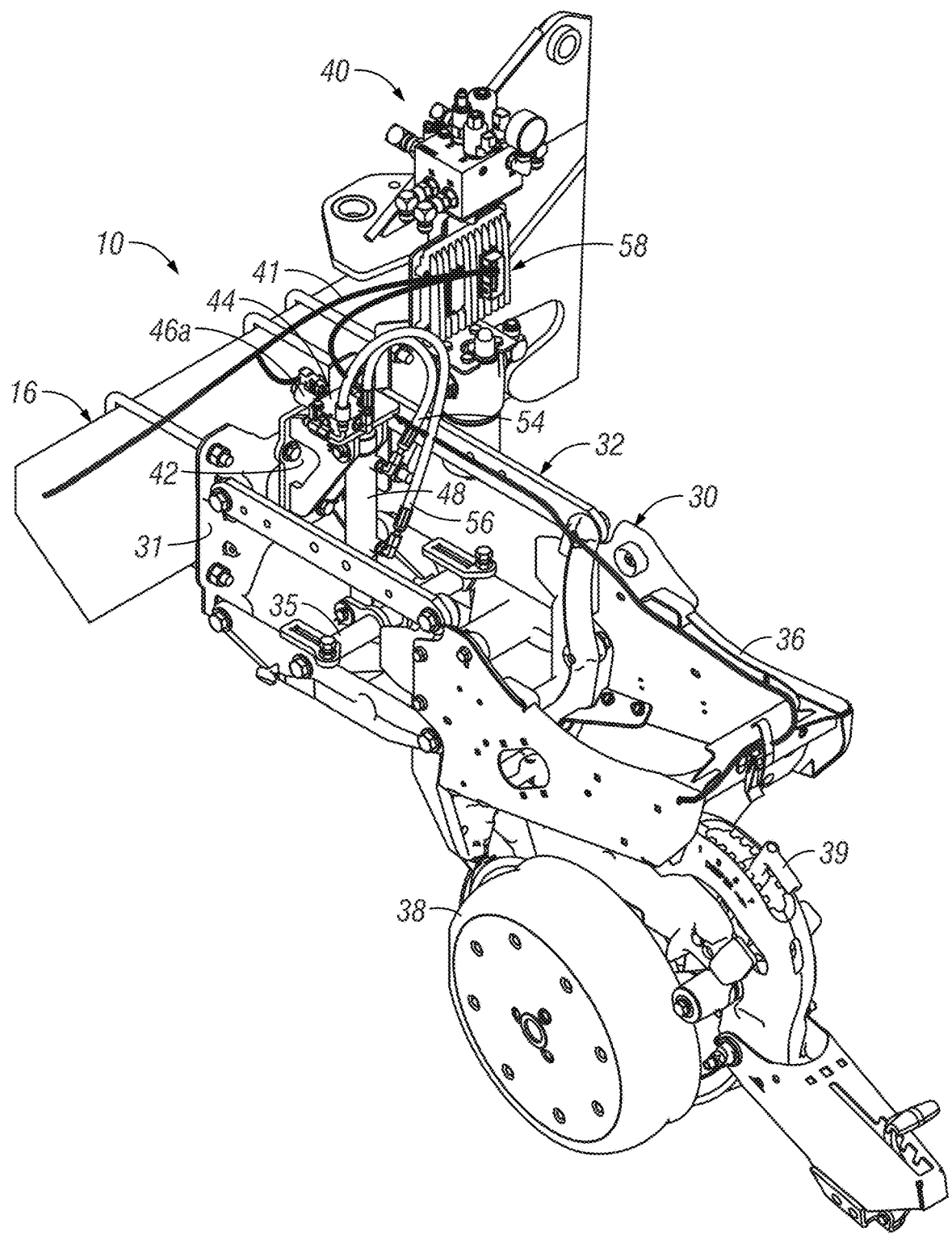
FIG. 4 is a perspective view of a single row unit.
Figure 5:
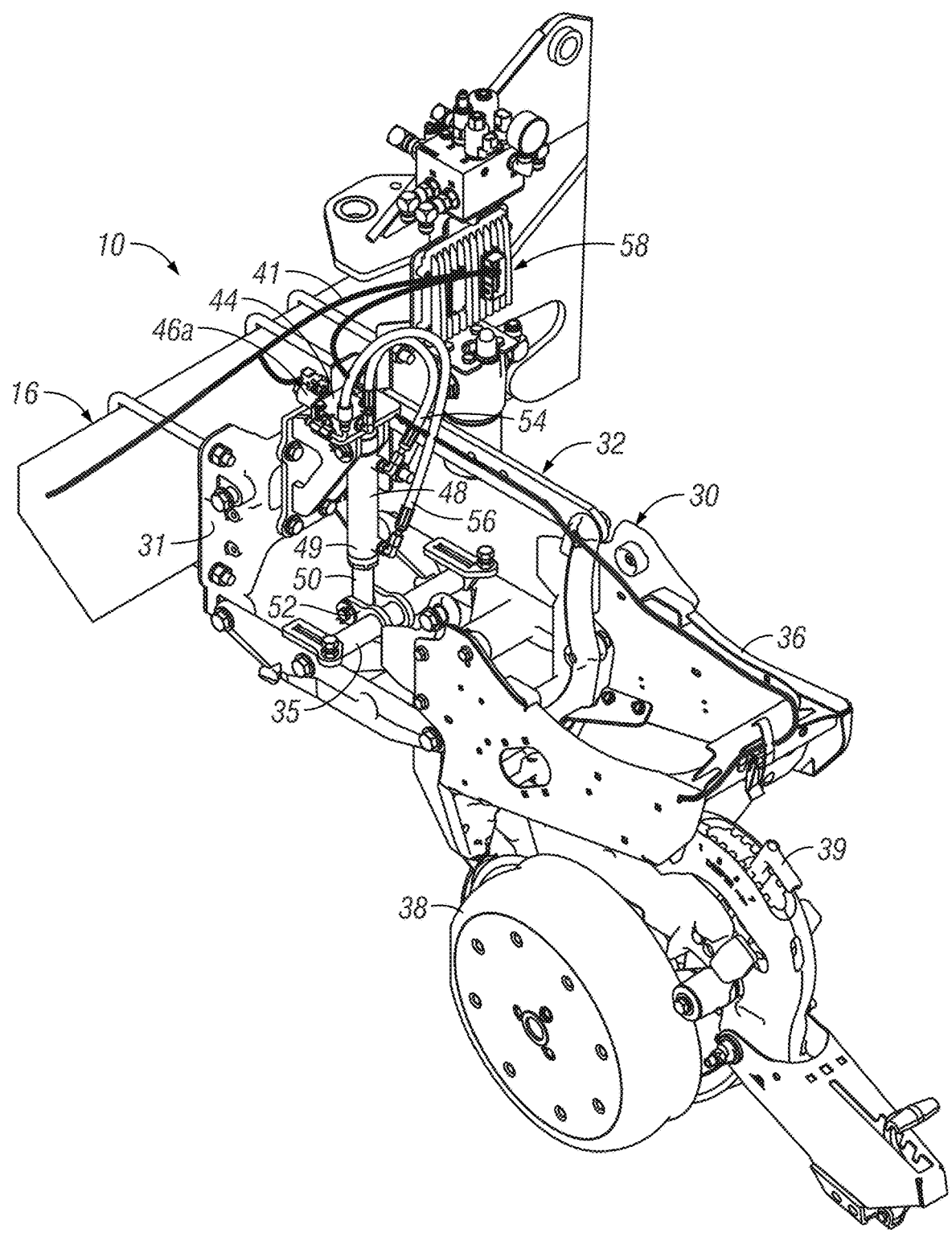
FIG. 5 is a perspective view of a single row unit with components removed.

As shown in FIGS. 3A and 3B, the force assembly 40, which can be used for both down and up force, comprises generally the components of a double acting cylinder 48, a manifold 44, a control valve 46, mounts 35, 42, and 52, and a control unit 58. Furthermore, the control valve 46, according to some aspects, will include two control valves. For example, the assembly 40 can include a down force control valve 46*a* and an up force control valve 46*b*. The down force control valve 46*a* can include a solenoid or other actuable member to allow for the adjustment of the valve. The up force control valve 46*b* can be actuable, or else can be such that the up force is generally maintained at system pressure, as will be understood herein. As understood, system pressure is generally whatever the pressure (e.g., hydraulic pressures) is coming in from the power/fluid source. Still further, it should be appreciated that the down force can be reduced to the point that the up force is variable. In such instances, the up force control valve 46*b* will be adjustable. However, it is to be appreciated that these components are not limiting or required in all instances, and the assembly 40 may include fewer or more components as may be required by the intended use thereof. For example, as will be understood, the assembly 40 may also include electrical wires, hydraulic hoses, and/or a sensing unit for determining the amount of down force being applied by the or at the row unit 30. Still further, one or more of the components may be omitted from the assembly.

FIG. 3B is a sectional view of a row unit 30 mounted to the toolbar 16 via the parallel linkage, as shown by the lines A-A in FIG. 3A. As is shown in FIG. 3B, the double acting cylinder 48 is operatively attached to the tool bar 16 via a mounting unit 42, which can include a U-bolt attached to the toolbar. Attached to a portion of the mounting unit 42 are the manifold 44 and the control valve 46. The control valve may include wires 41 that are connected to a control unit 58. The control unit 58 may be an intelligent control such as a processing unit, computing unit, CPU, server, or generally any other processing unit capable of receiving instructions, storing instructions, interpreting instructions, and/or providing instructions and controlling an operation of the down force assembly 40. Thus, the control unit 58 can be utilized to provide commands to the control valve 46 for operating the down force assembly 40. The control unit 58 may be connected, via hardwire or wirelessly, to a user interface, separate computing unit (tablet, phone, server, computer, etc.) and can be pre-programmed or otherwise capable of receiving instructions to pass along to the downforce assembly 40.

A double acting cylinder 48 includes a housing portion 49 and a rod 50. The rod includes a piston portion (not shown) generally within the housing 49, which can separate the housing into a first chamber 61 on the piston side of the rod, and a second chamber 62 on the rod side thereof.

As is shown throughout the figures and as will be understood, an aspect of the invention includes that the control valve 46 and manifold 44 are generally divorced from the double acting cylinder 48 such that they are not supported thereby. In other words, the control valve 46 and manifold 44 are not directly coupled to the cylinder 48, and are otherwise separable by some distance therebetween. The manifold 44, which, based upon action of the control valve, can control the flow of a fluid, such as hydraulic fluid, can be coupled to the first and second chambers on opposite sides of the piston in the cylinder housing. As stated, the control valve 46 can include multiple control valves, such as a valve for down force 46*a* and one for up force 46*b*.

For example, it is to be appreciated that the housing 49 of the cylinder 48 includes a first chamber 61 at the upper end of the housing and a second chamber 62 generally at a lower end of the housing and on the opposite side of the piston on the rod side thereof in the housing. A downforce hose 54 is connected generally between the manifold 44 and the first chamber 61 of the cylinder 48. This could be by way of a "TEE" connection, such as that shown by numeral 46*b* in FIG. 7. A second hose 56 (up force hose) is connected between the manifold 44 and the second chamber 62 of the cylinder 48. However, the second hose 56 (up force hose) could be directly connected/coupled to system pressure, wherever the system pressure source may be. Addition of the hydraulic fluid from the manifold via the first hose 52 to the first chamber 61 will extend the rod 50 of the cylinder 48 to provide a net down force on the row unit 30. In other words, the addition of fluid creates pressure by addition of volume in the chamber, and it is the pressure that creates the net force. Likewise, the removal of fluid from the first chamber 61 and added to the second chamber 62, such as by the hose 54 and 56 via the manifold 44, will provide a retraction of the rod 50 relative to the housing 49, which will constitute an up force on the row unit 30. This up force will provide for a reduced amount of force or weight of the row unit relative to the ground.

Figure 22:
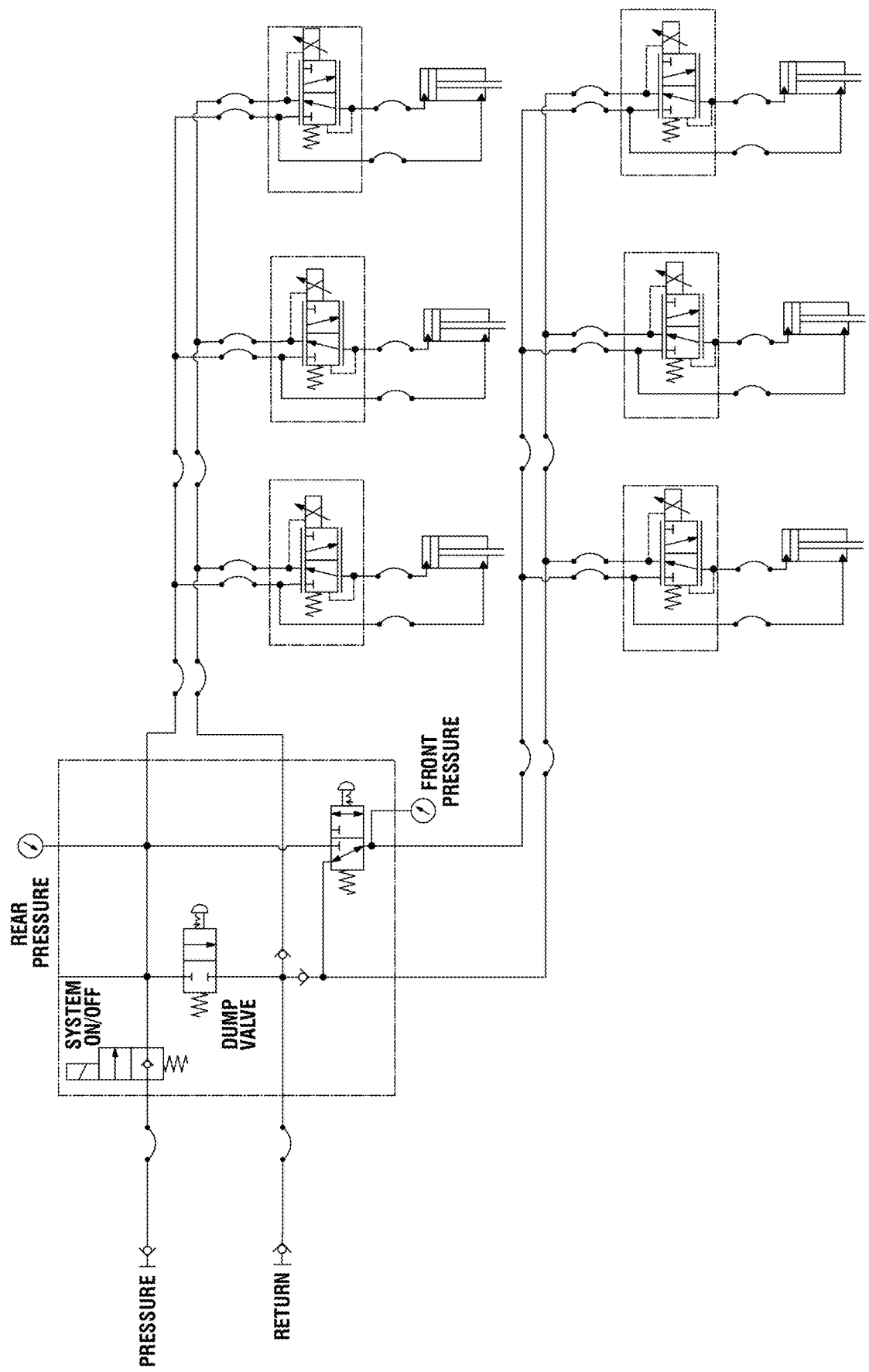
FIG. 22 is a schematic of an up and down force system showing the cylinders set to have an up force substantially at system pressure.

As the down force control valve 46*a* is electrically coupled to the control unit 58 via wires 41, the control unit 58 will communicate to the control valve 46*a*, which may be a solenoid, on the actuation or operation of the fluid via the manifold 44, which will then provide the hydraulic fluid to the first or second chamber 61, 62 of the cylinder 48, and to provide such net up or down force thereto. Furthermore, it should be appreciated that the down force control valve 46*a* is generally electrically controlled, but the up force control valve 46*b* is set to provide a substantially constant up force, i.e., the up force is at system pressure as shown in FIG. 22. The control unit 58 can be operated in a number of ways. For example, as shown in FIG. 3B, a sensor 60 is positioned at the row unit 30 and is configured to determine the amount of down force being applied via the row unit 30. The sensor 60 can be a number of types of sensors, and can include strain gauges, pressure transducers, or generally any other sensing configuration to calculate and/or determine amount of force being felt by the row unit. In some configurations, the sensor can be coupled to the control unit 58 such that a change of down force sensed by the sensor 60 will activate the control unit 58 to provide a change in the down and/or up force of the assembly 40. It is also contemplated that the sensor 60 can be in communication with a user display or graphic user interface of an operator. This graphic user interface can display the amount of down force being provided and being calculated by the sensor 60 such that an operator can manually communicate to the control unit 58 to adjust the amount of down force and/or up force applied by the down force assembly 40 to the row unit 30. Therefore, it is contemplated that the control of the down force assembly 40 can be manual and/or automatic.

The double acting cylinder 48 can be mounted to the mounting unit 42 of the force assembly 40 at a first end and can be connected to the row unit 30, such as via the linkage 32 at the opposite or rod end 50 at a connection 52. As shown in FIGS. 2-5, a cross bar 35 extends between the lower arms 34 of the linkage 32. This cross bar 35 can be positioned generally anywhere along the length of the lower arms 34. The rod 50 is connected to the cross bar 35 such that the rod 50 can be rotatably connected thereto to allow for the connection to rotate about the cross bar 35. Therefore, when a down force is activated by the force assembly 40, the hydraulic fluid will be added to the first chamber 61 of the cylinder 48 via the hose 54 through the manifold 44, which will extend the rod 50 from the housing 49. This extension will provide a force in a generally downward direction towards the cross bar 35, which will impart a downward pressure to the row unit 30. When the down force is to subside, or an up force is to be applied via the down force assembly 40, the hydraulic fluid can be provided via the hose 56 to the second chamber 62 of the cylinder 48, which will impart a force on an underside of a piston therein, which will retract the rod 50 relative to the housing 49. This will cause a lifting force generally at the cross bar 35, which will provide an up force and reduce the amount of force on the row unit 30 relative to the ground. Therefore, the downforce assembly 40 as shown and described herein will provide for both down and/or up force via the connection to the cross bar 35. However, it is to be appreciated that use of the cross bar, such as that shown in FIGS. 2-5 is not the only manner of connecting the cylinder 48 to the linkage or any portion of the row unit to provide the down or up force.

Figure 6:
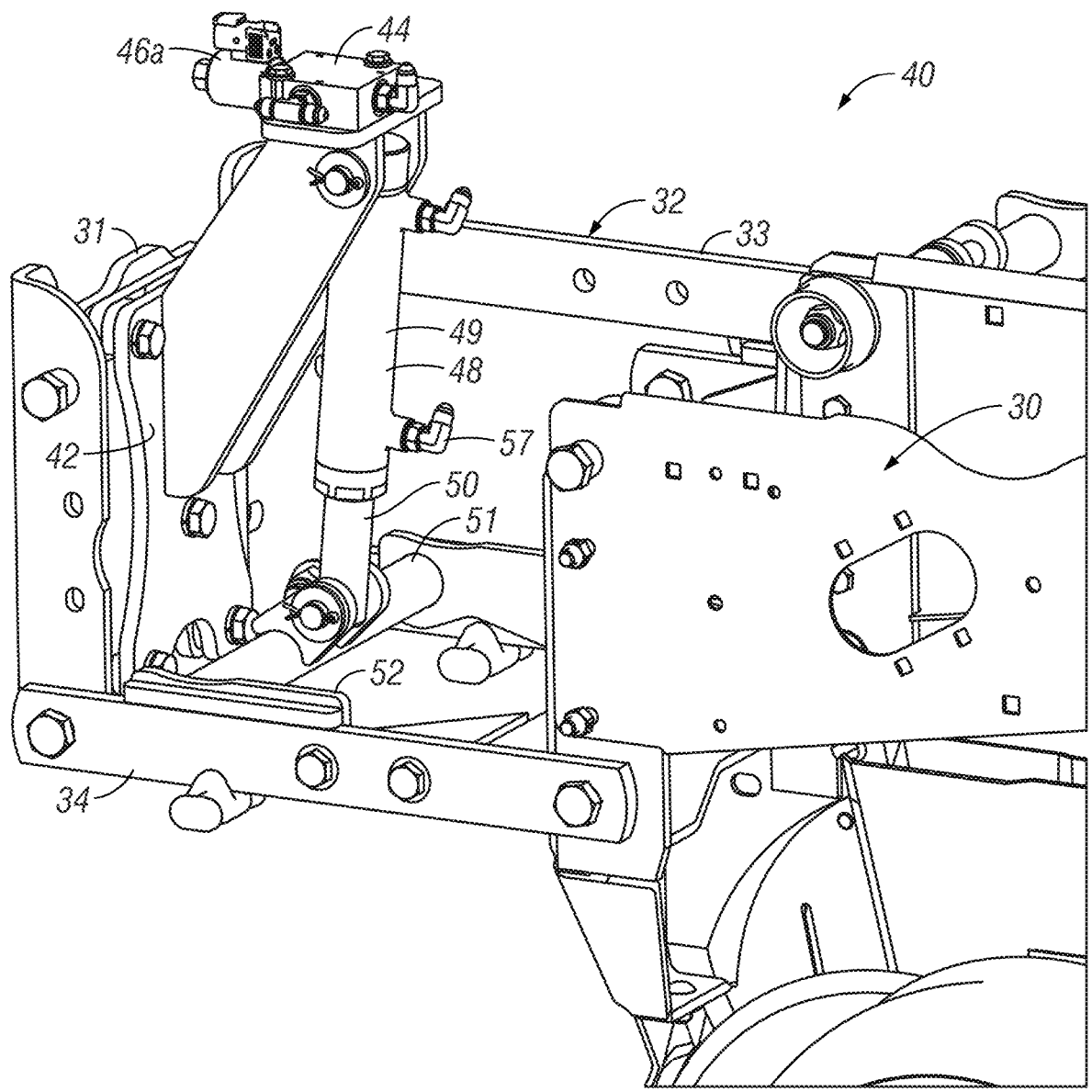
FIG. 6 is an enlarged view of a portion of a row unit showing aspects of the up/down force assembly according to the invention.

For example, FIGS. 6-15 disclose additional aspects of the disclosure which include variations on how the force assembly 40 can be connected to the linkage 32. As shown in FIG. 6, for example, the cylinder 48 is connected to a carriage assembly 51. The carriage assembly 51 includes members which are generally U-shaped, and which are rotatably connected to the lower arms 34 of the linkage 32. However, the operation of the cylinder and its connection to the manifold 44 in control valve 46 will be maintained, such that the control valve and manifold will control the extension in a retraction of the rod of the cylinder 48. However, when the rod 50 is extended, the force will be on the carriage 51, which will then impart a net down force on the lower arms 34 of the linkage 32, which will impart a net down force on the row unit 30. A retraction of the rod 50 will impart a net up force on the row unit 30 based on the connection of carriage 51 to the lower arms 34 of the linkage 32 as well.

Figure 7:
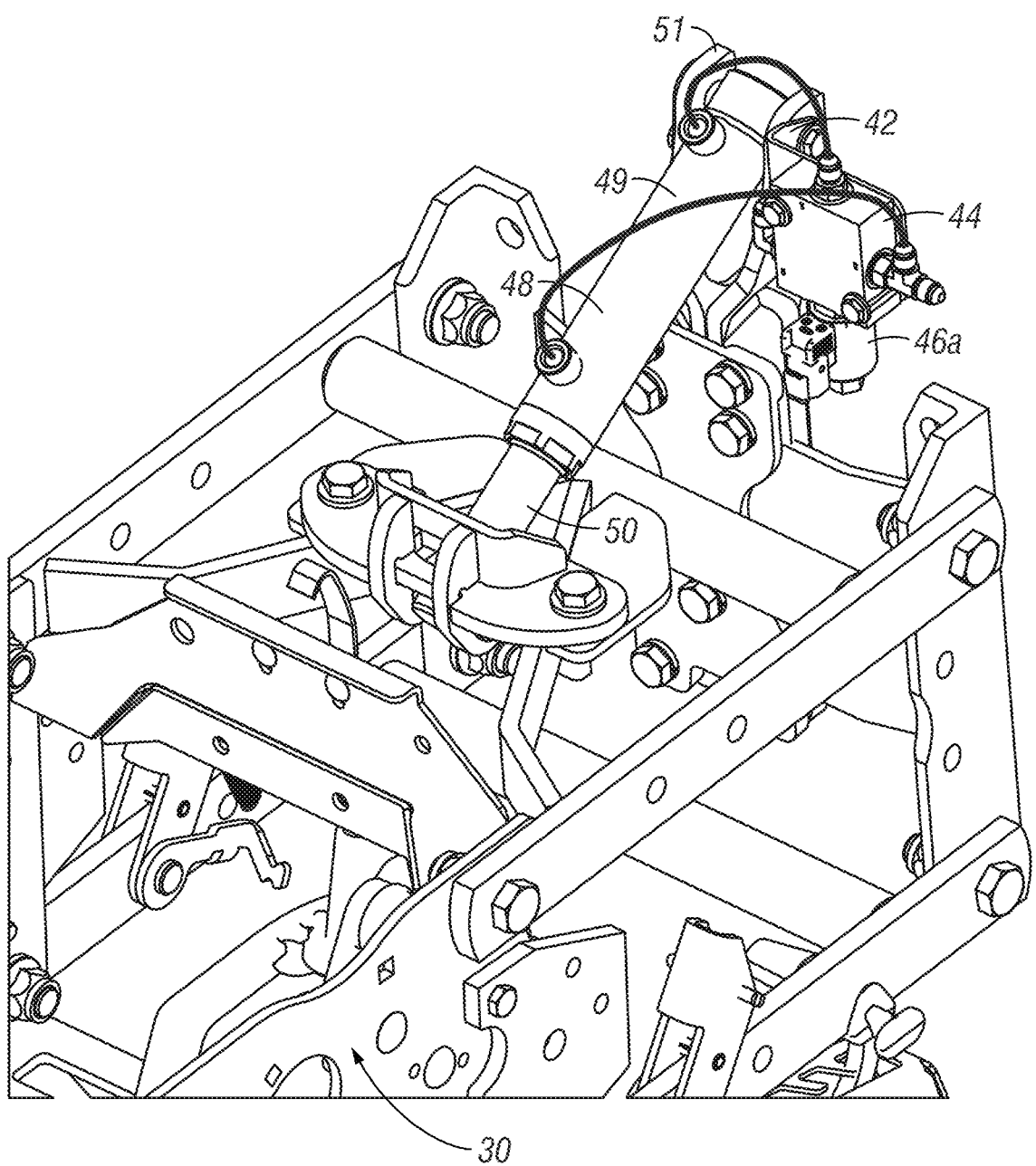
FIG. 7 is another enlarged view of the row unit.
Figure 8:
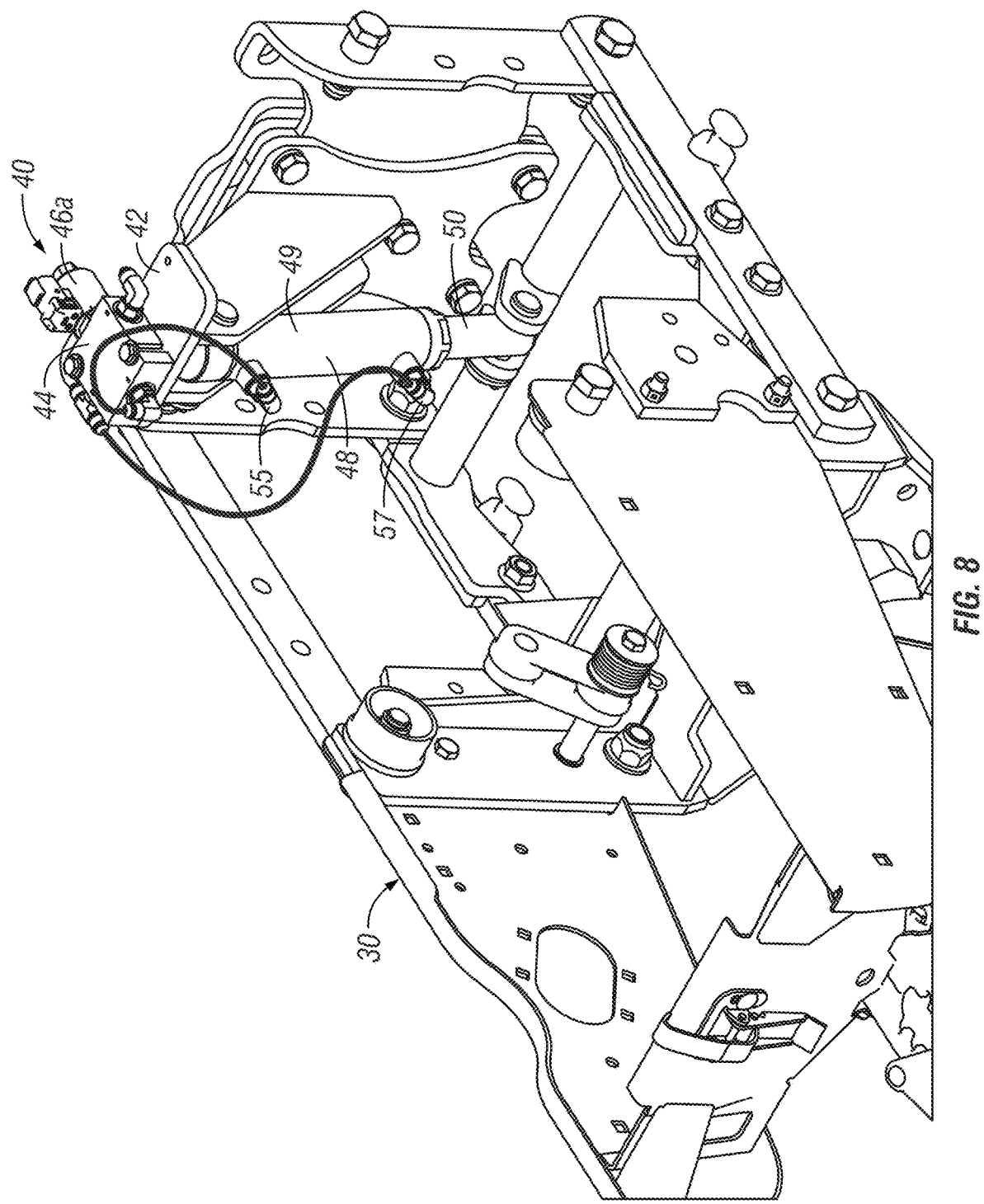
FIG. 8 is yet another enlarged view of the row unit and up/down force assembly.
Figure 9:
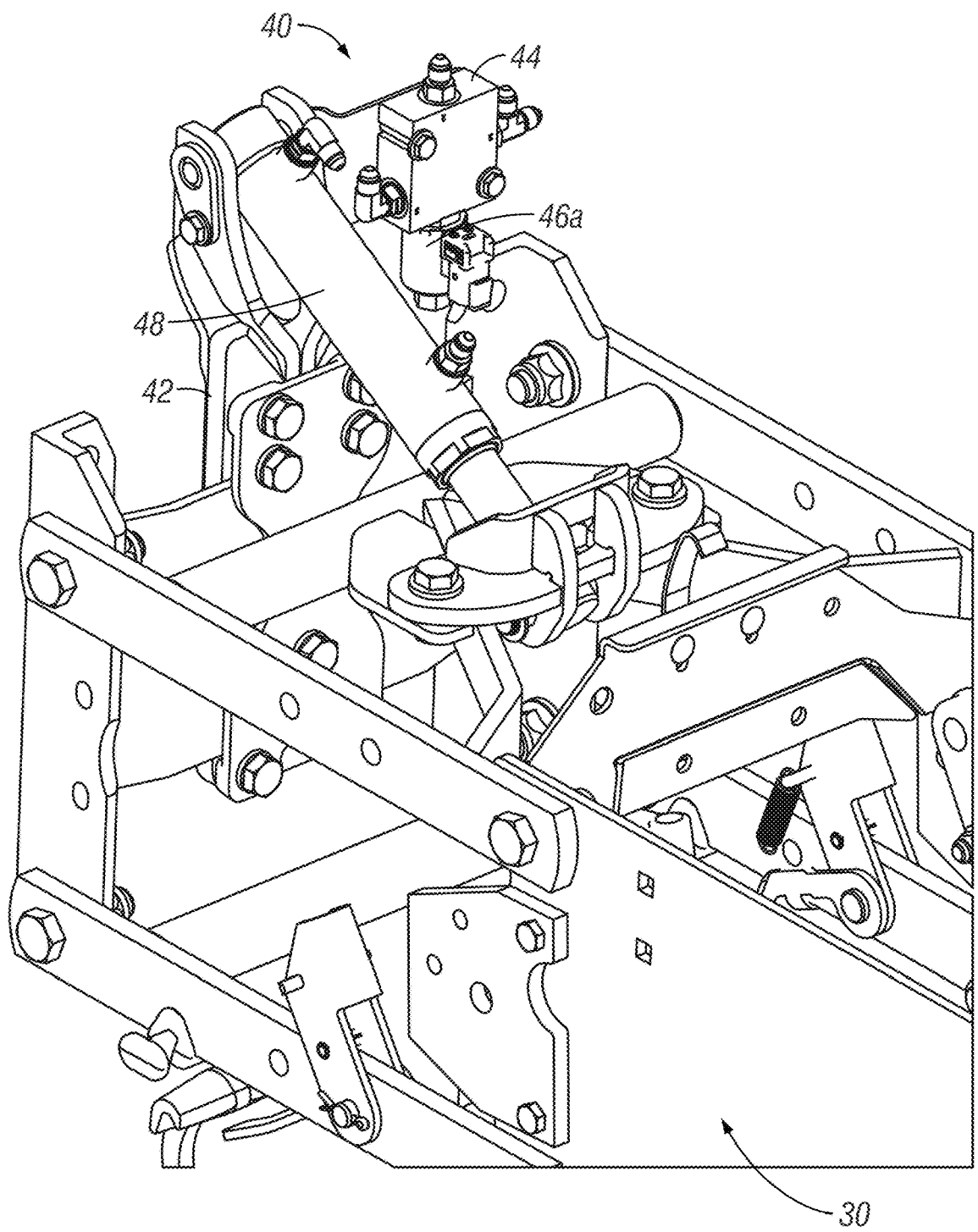
FIG. 9 is still another enlarged view of the row unit and up/down force assembly showing the components in another configuration.
Figure 10:
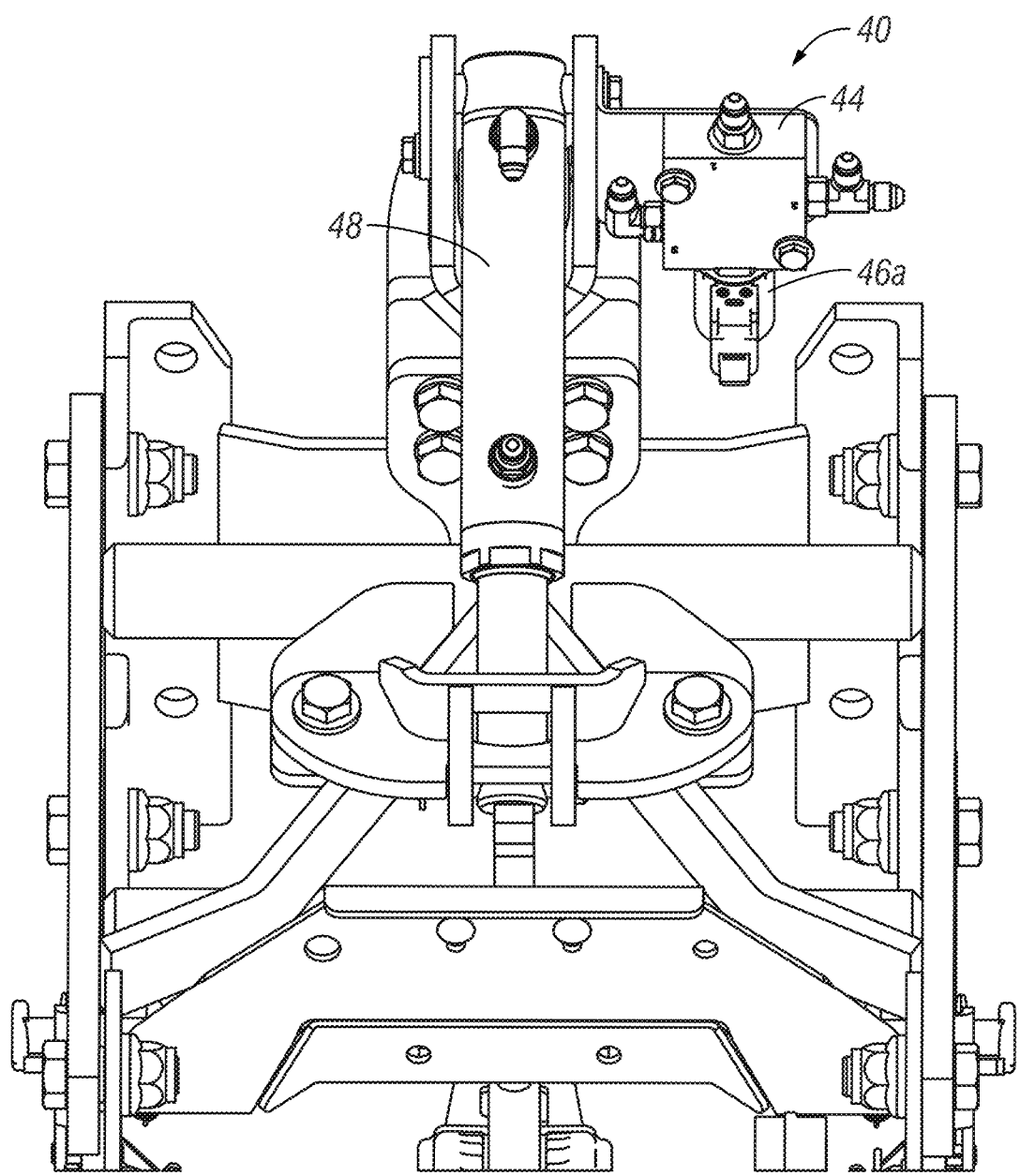
FIG. 10 is a top, rear, enlarged view of the row unit and up/down force assembly.
Figure 11:
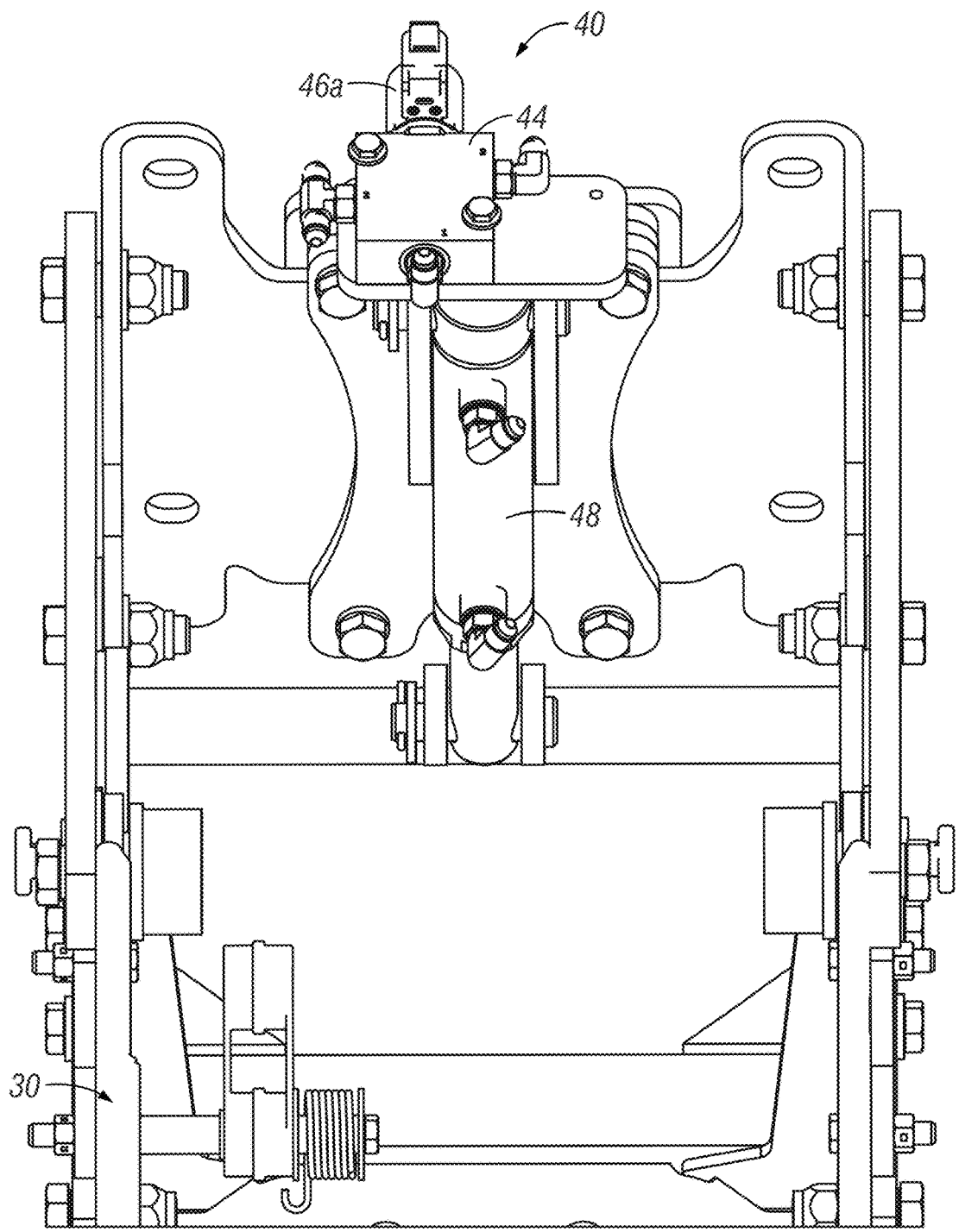
FIG. 11 is a top, planar, enlarged view of the row unit and up/down force assembly.
Figure 12:
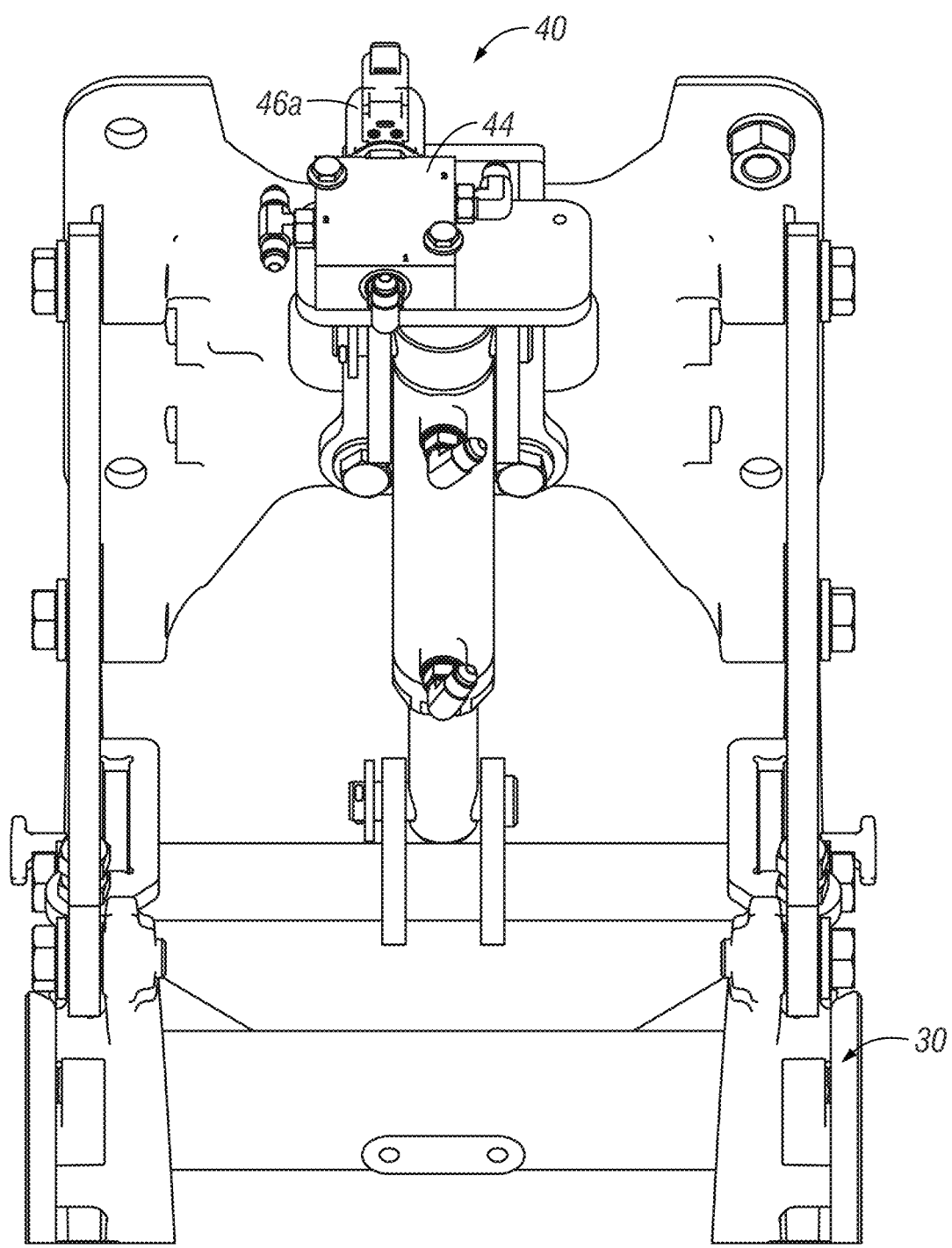
FIG. 12 is another top and enlarged view.
Figure 13:
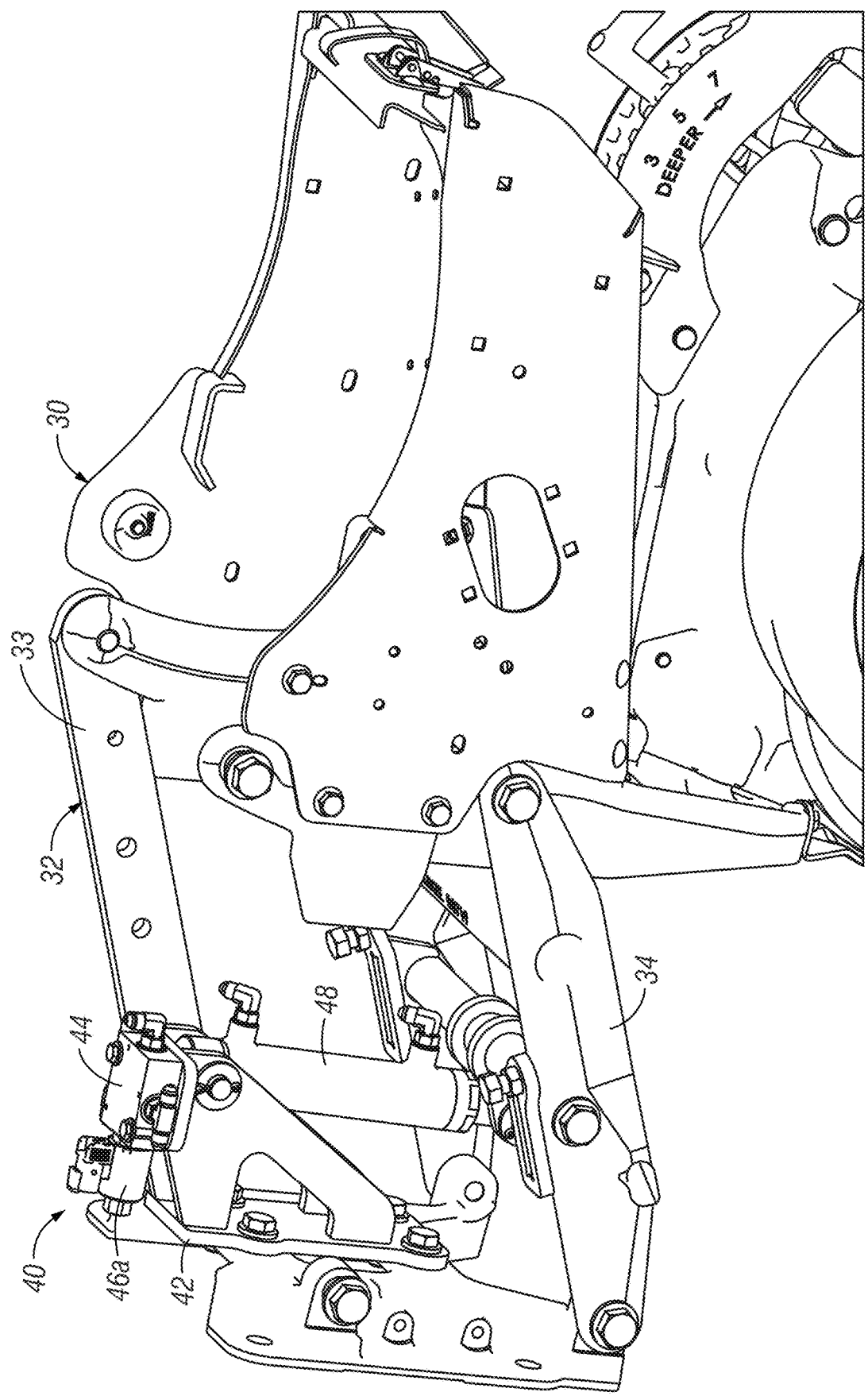
FIG. 13 is a side, enlarged view of a configuration of a row unit with a up/down force assembly.
Figure 14:
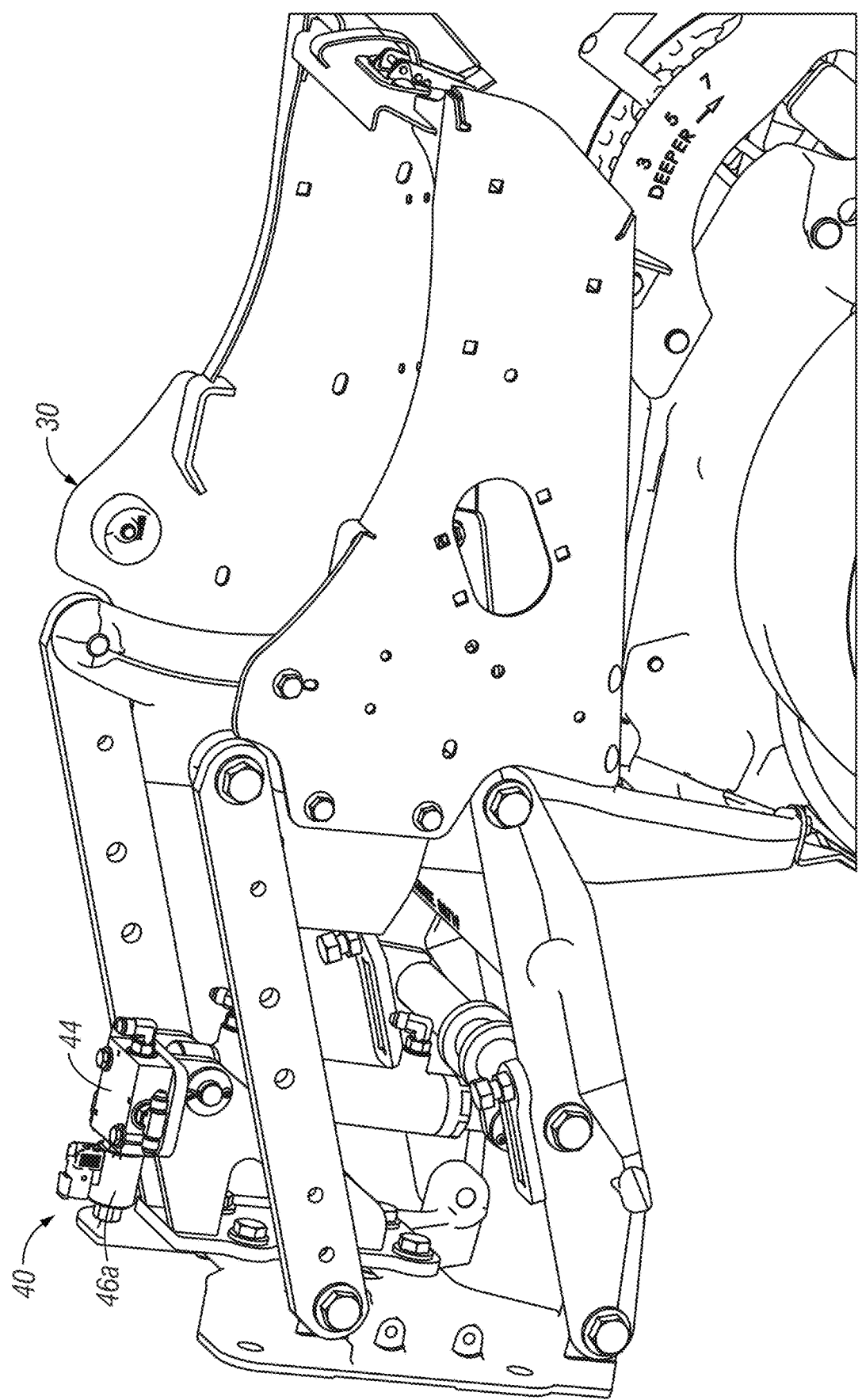
FIG. 14 is a view of FIG. 13 with linkage added.
Figure 15:
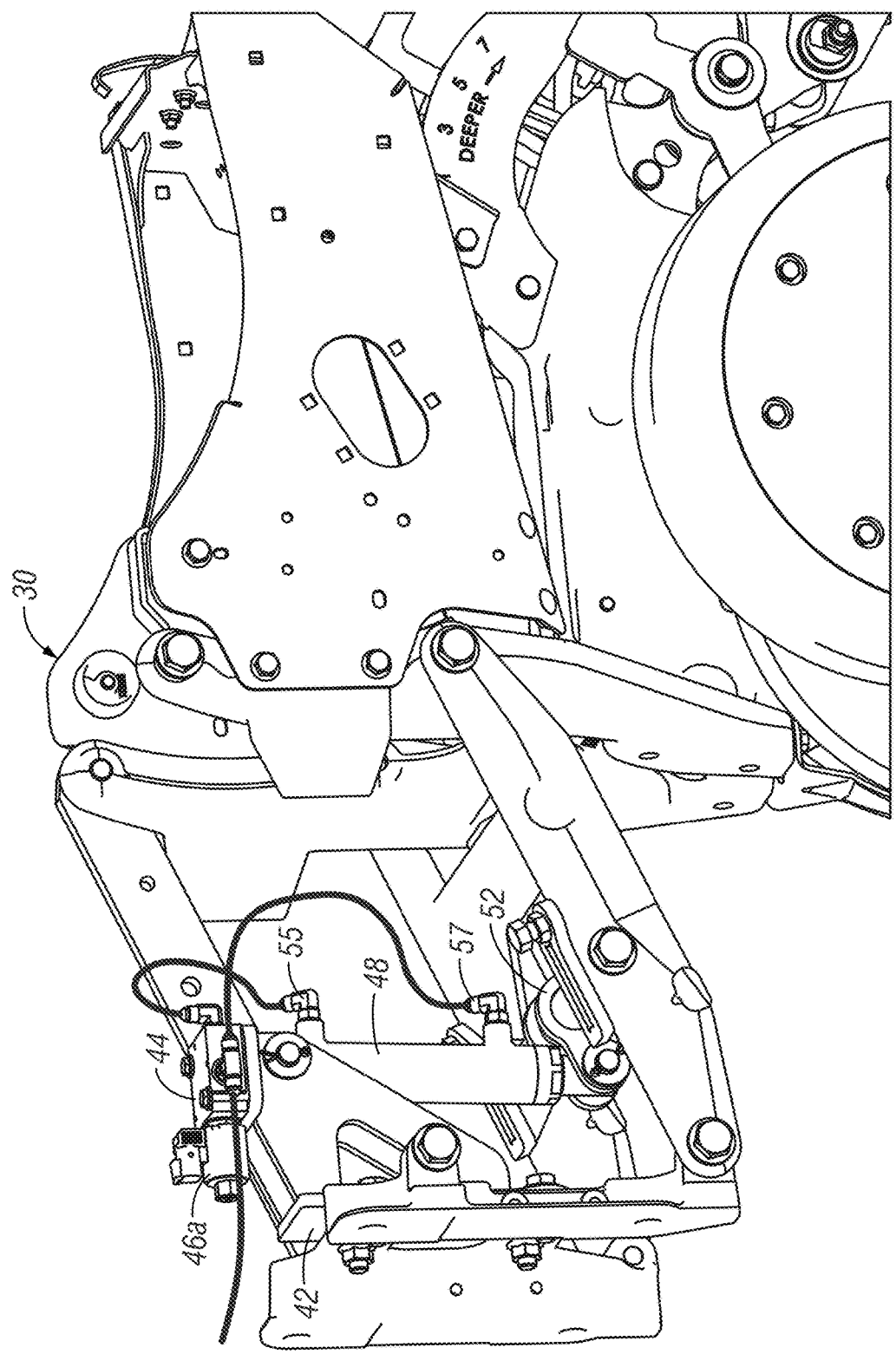
FIG. 15 is a front and side view of a row unit with an up/down force assembly according to aspects of the invention.

Still further, FIG. 7 shows an additional version of the carriage in which the cylinder in a similar orientation as previously disclosed herein with the carriage rotatably connected to the force assembly mount 42 and the housing 49 of the cylinder being connected to a portion of the linkage. However, the extension of the rod relative to the housing will still provide for a down force net effect on the row unit, and retraction of the rod 50 relative to the housing 49 will result in a net up force on the row unit 30. In addition, the cylinder itself may not be reversed, and instead be set up so that the system is set up generally in the manner such as in previous manners. Therefore, the invention disclosed herein should not be limited to an exact configuration shown in the figures, and it is to be appreciated that generally any connection of the cylinder to the linkage and/or row unit is to be considered a part of the invention disclosed herein.

Figure 16:
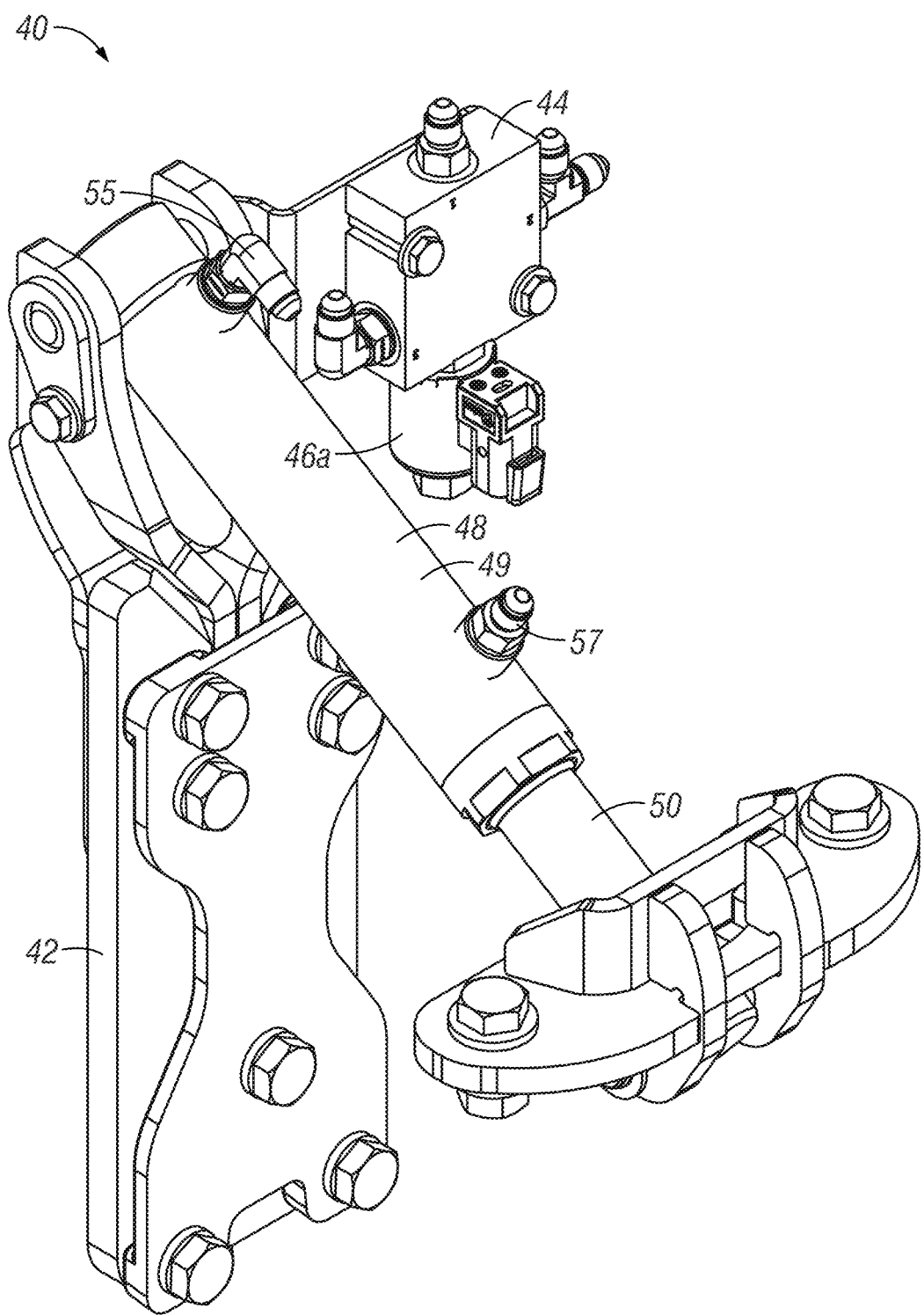
FIG. 16 is perspective view of an up/down force assembly according to aspects of the invention.
Figure 17:
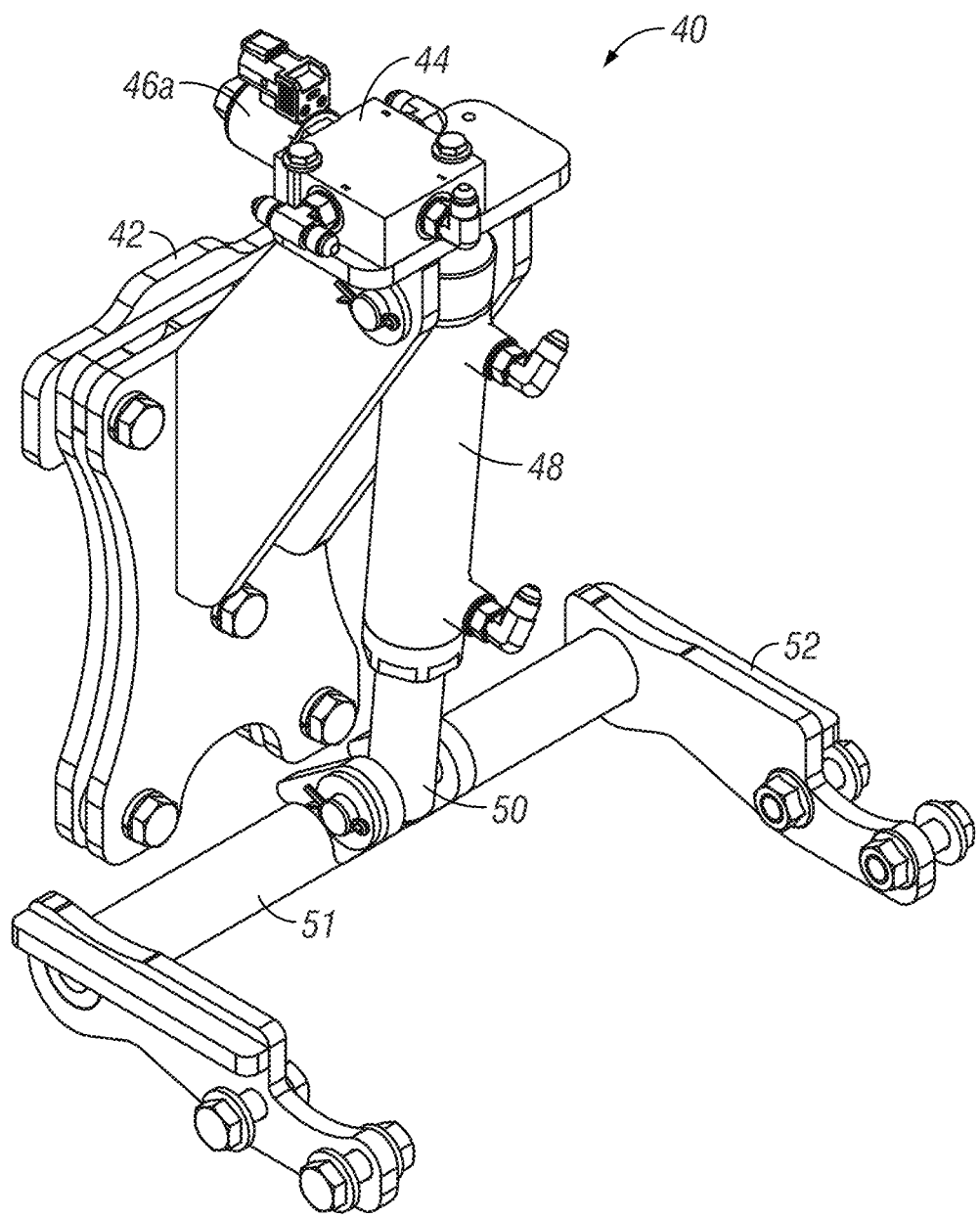
FIG. 17 is another view of an up/down force assembly according to aspects of the invention.
Figure 18:
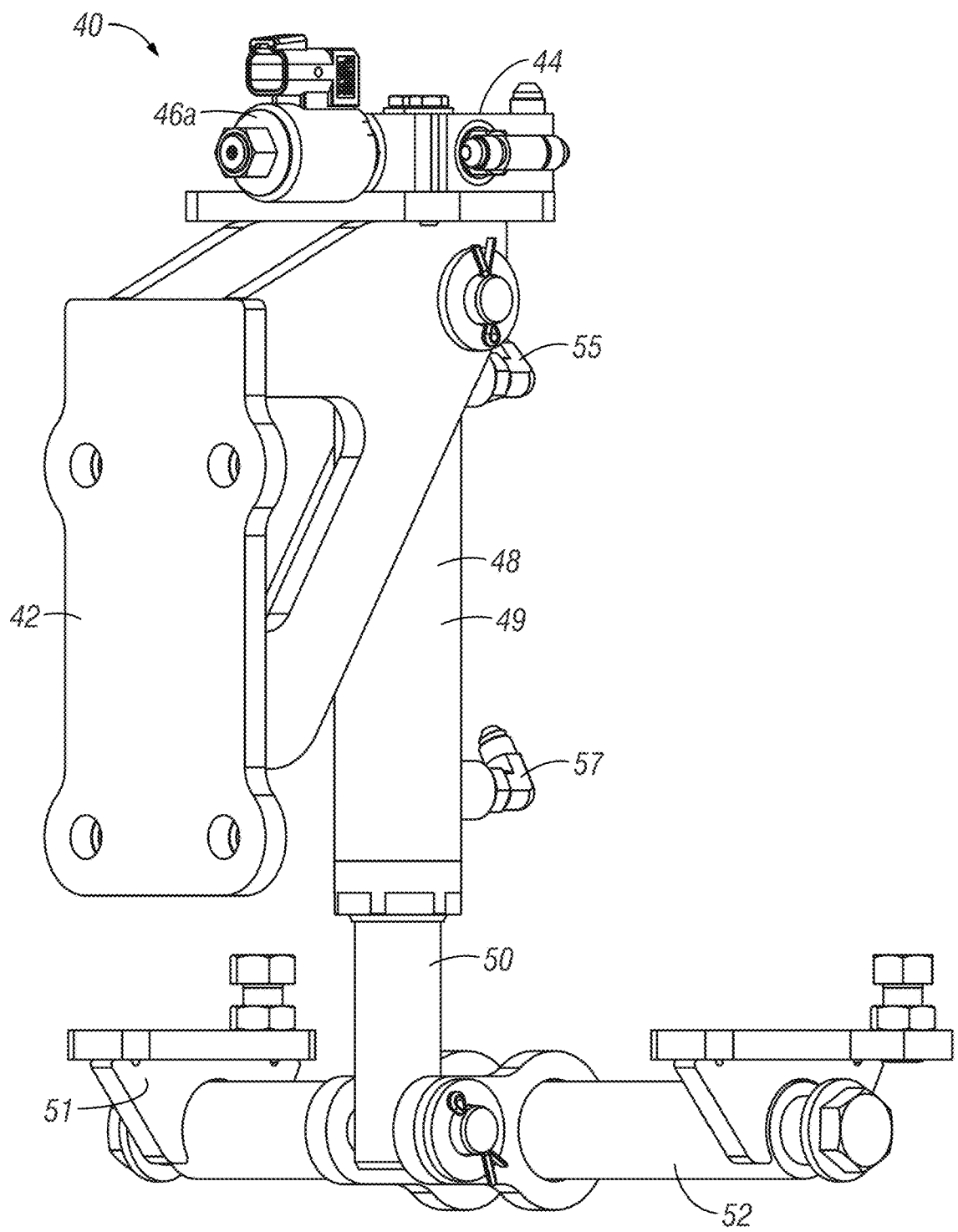
FIG. 18 is a front, perspective view of the up/down force assembly of FIG. 17.

FIGS. 16-18 disclose yet other views of the assembly 40 absent the row unit 30 and/or tool bar 16.

Figure 19:
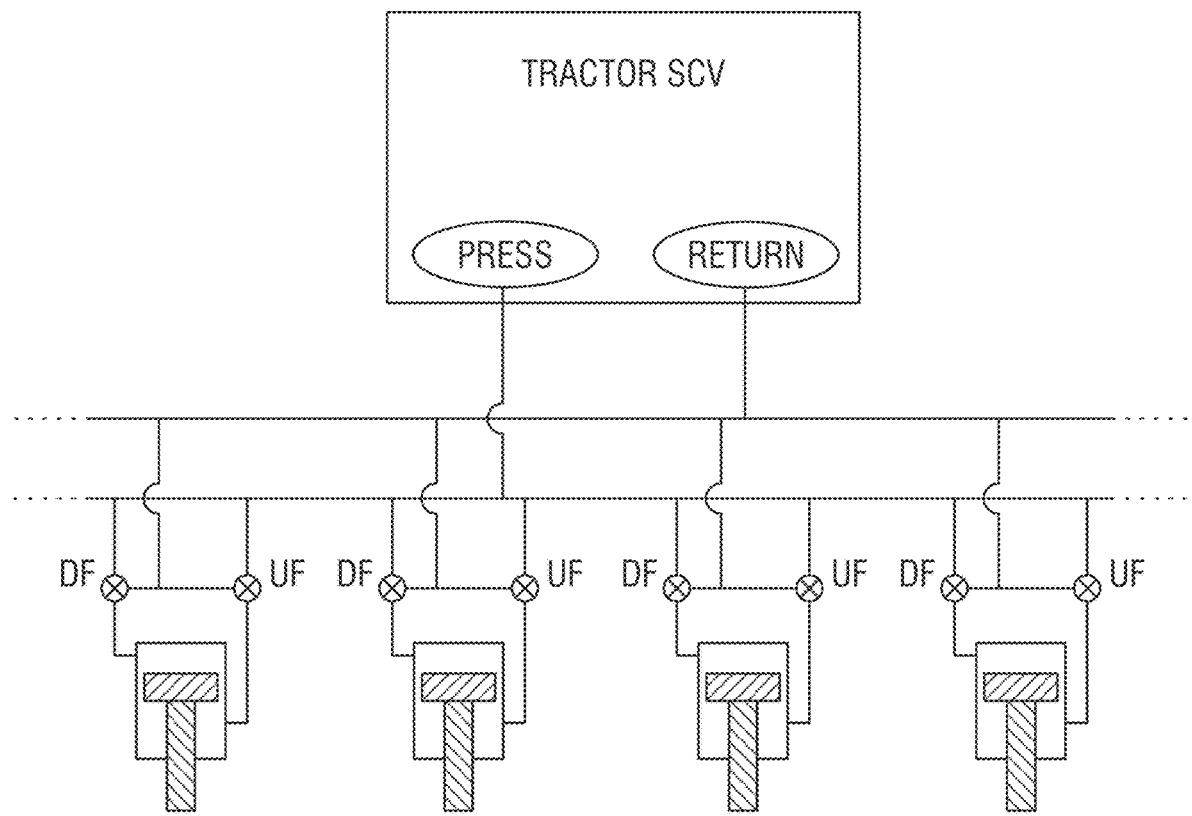
FIG. 19 is a schematic showing multiple row units with double acting cylinders.
Figure 20:
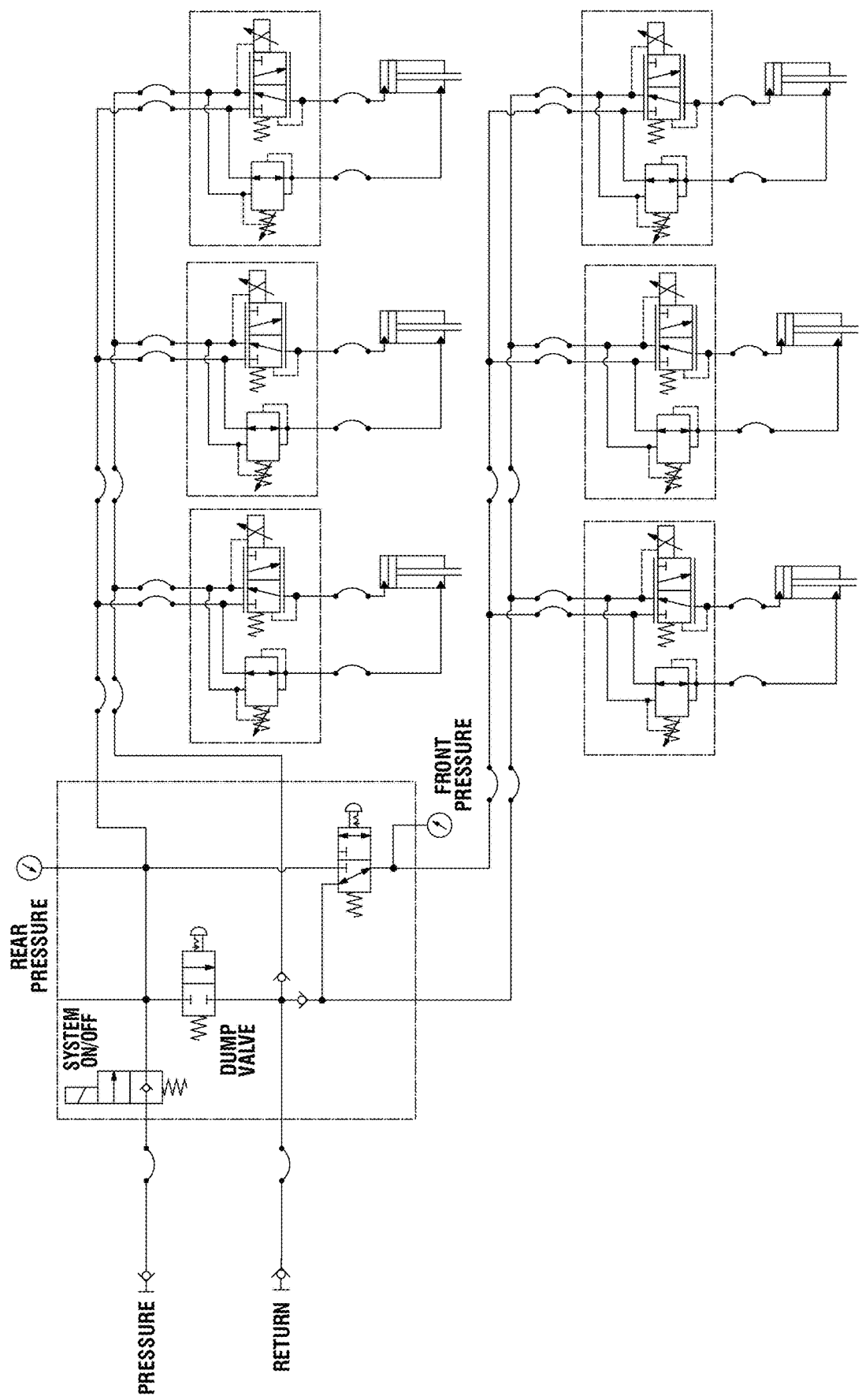
FIG. 20 is a schematic of an up and down force system including a valve at each row unit to control the up force pressure.

FIG. 19 shows a schematic of a force assembly according to aspects of the present disclosure. The figure shows the actuator connected to a tractor to control the flow of hydraulic fluid. The figure shows the up and down force chambers of a cylinder, which are on opposite sides of the piston of the actuator. The bore of the cylinder could be sized relative to the rod to provide an up force at system pressure, such as that set by the hydraulic power source. This can eliminate, mitigate, and/or reduce the need for a separate up force valve. To overcome this up force, an amount of fluid could be directed towards the upper portion of the cylinder to press the piston and rod downward, which would impart a downforce on the row unit.

In order to size the bore of the actuator/cylinder relative to the rod, it is noted that the actuator 48 includes a housing 49 and a rod 50. At the end of the rod 50 within the housing, there is a piston (see, e.g., FIG. 19). The housing 49 will have a cross-sectional area A1. The rod can have a cross-sectional area A2. Taking A1-A2 will result in the net area for up force, which can be shown as A3. The net amount of downforce (F) can be found by taking the regulated pressure (PA1) above the piston and subtracting the system pressure on the rod side of the piston (PA3). The maximum downforce (Fmax) can occur when the system pressure (Psystem) is felt on the surface or cross-sectional area of the rod diameter (A2). Similarly, the minimum downforce (Fmin) occurs when the PA1 is zero. Fmax, Fmin, and Psystem are known parameters, which allow you to find the ideal A1 and A2 for the system.

FIGS. 20-25 show schematics of row unit supplemental force hydraulic systems according to various aspects of the disclosure. For example, in FIG. 20, there is shown to be a control valve at each row unit that controls the amount of up force being applied by the assembly. There is no up force main shutoff.

Figure 21:
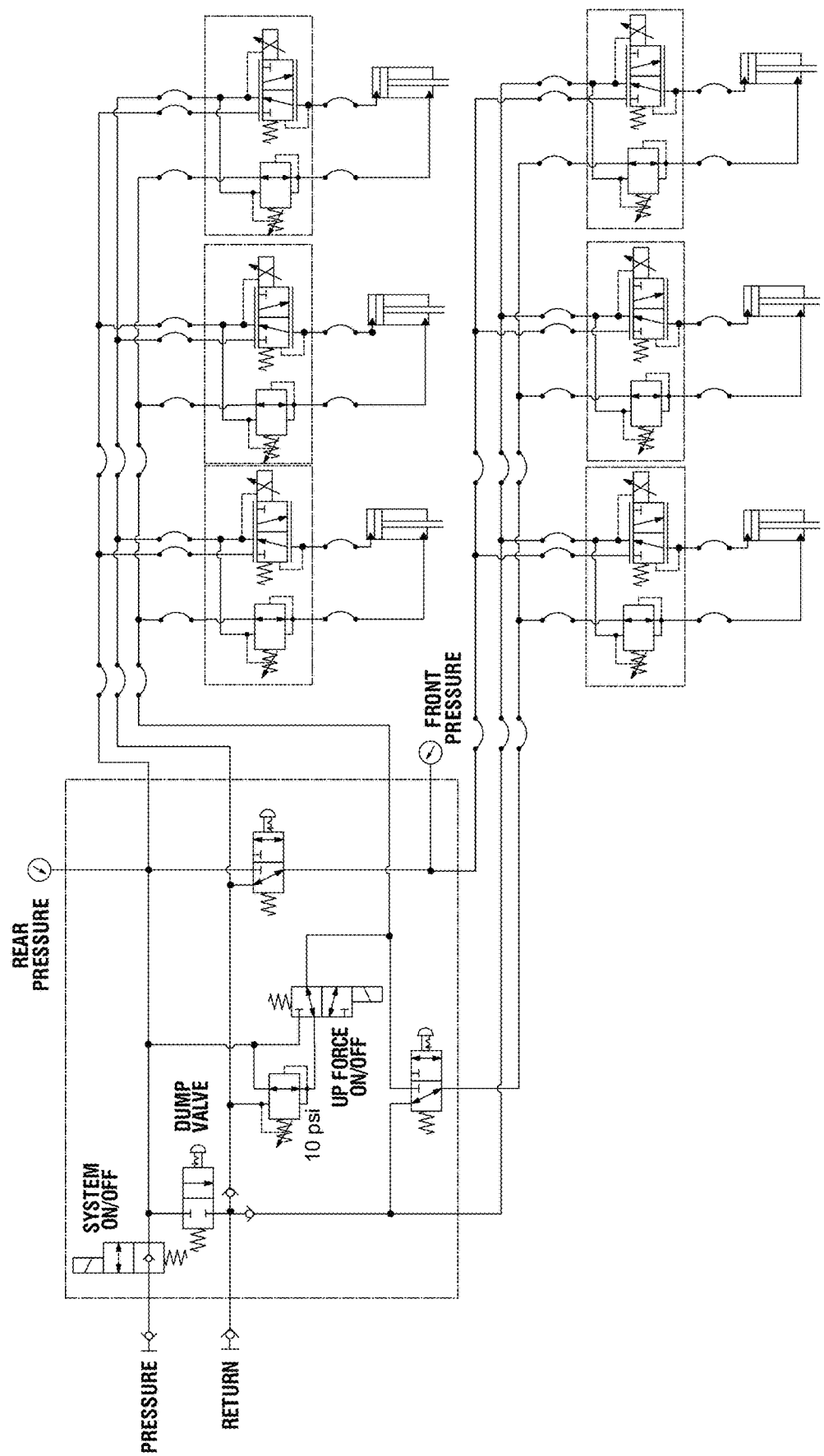
FIG. 21 is a schematic of an up and down force system showing a valve at each row unit and an on/off controller for all of the rows.

FIG. 21 discloses a system wherein the control of up force is at each row, such as with a valve. In addition, there is a single on/off control valve that operates as a shutoff for all of the rows that can be activated to shut off the up force being applied thereto and/or thereat. The single control valve (shown as the "UP FORCE ON/OFF" in the figure) controls all of the rows.

FIG. 22 is a schematic showing a situation wherein the up force is at system pressure, such as set by the hydraulic power source. There are no up force valves at the rows or otherwise that control the amount of up force to the cylinders/systems at each of the rows. There is no singular shut off for the up force, and the down force is added to overcome the up force at the system pressure. One additional significant advantage of eliminating the up force valve as shown in FIG. 22 is that it reduces the hydraulic flow requirements from the power source. When you eliminate the up force valve, the fluid from the rod side is forced to the piston side and reduces the quantity from the power source that is required to fill that chamber. Oil flows to the piston side of the cylinder and reduces the hydraulic demand from the power source when the rod extends.

Figure 23:
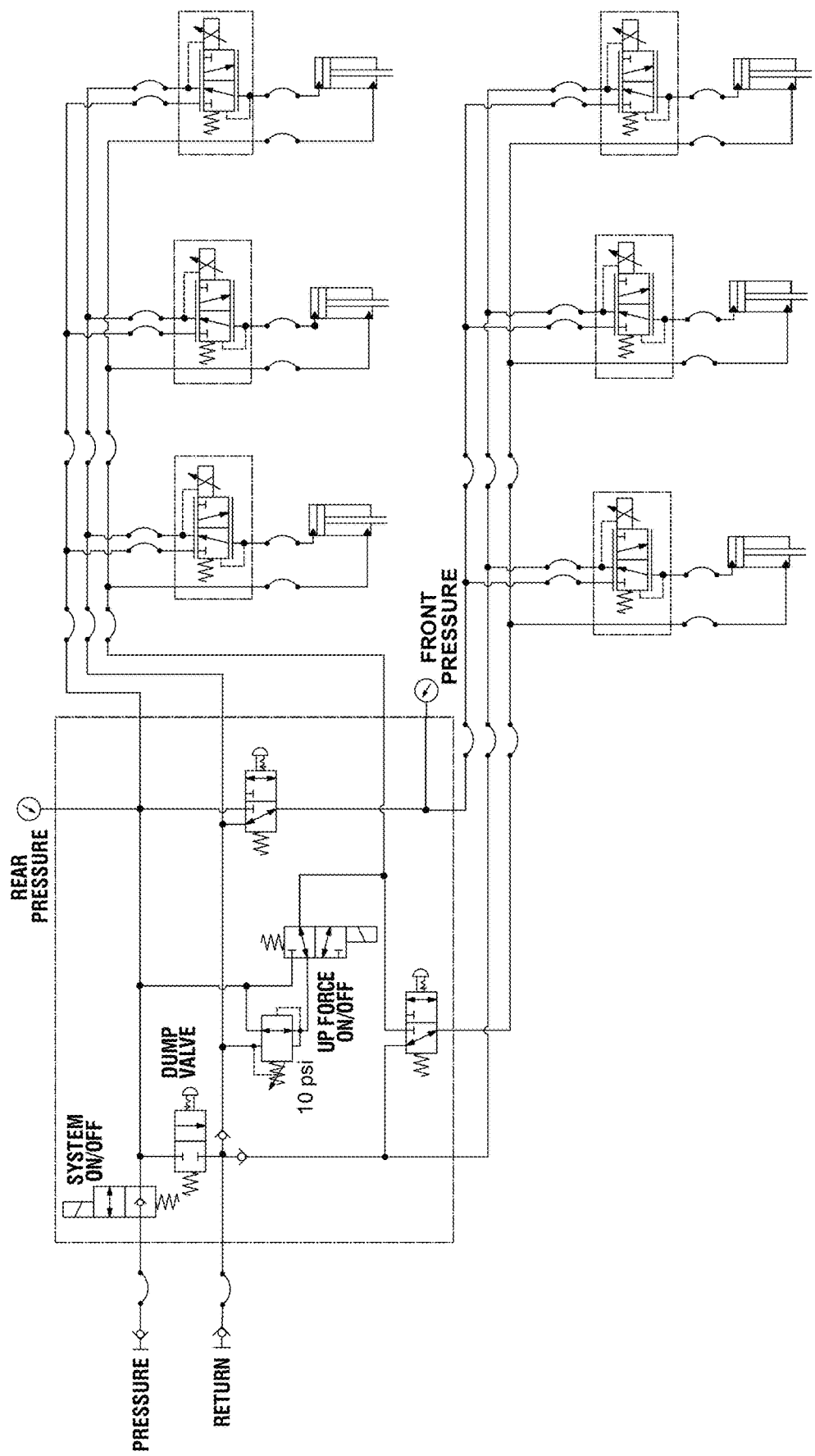
FIG. 23 is a schematic of an up and down force system similar to FIG. 22, but with one on/off controller to control for all rows.

FIG. 23 is a schematic with no valves at the row units to provide up force, and instead, where the up force is provided at system pressure. However, unlike FIG. 22, there is a singular up force on/off control valve that is used to turn on or off the up force at all of the rows together.

Figure 24:
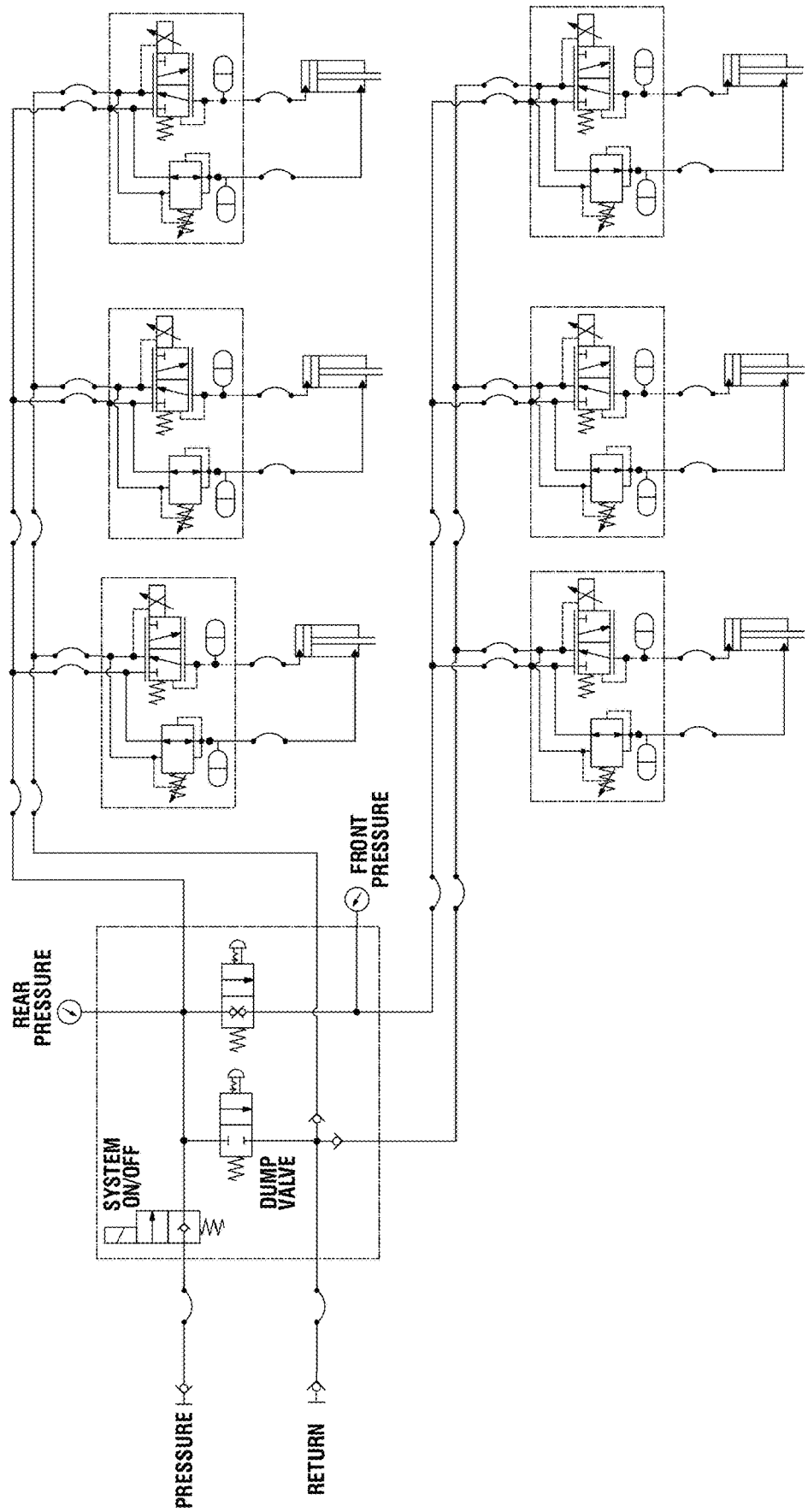
FIG. 24 is a schematic of an up and down force system with a valve at each row to control the up force, and also showing an accumulator at each valve block of the rows.

FIG. 24 is a schematic in which each row of the planter and including an assembly includes a control valve to control the amount of up force for the row unit. There is no singular on/off shut off controlling the rows. However, the schematic of FIG. 24 does include accumulators associated with the actuator assemblies. The accumulators are divorced from the actuators, and are situated with the valve blocks of the assemblies.

Figure 25:
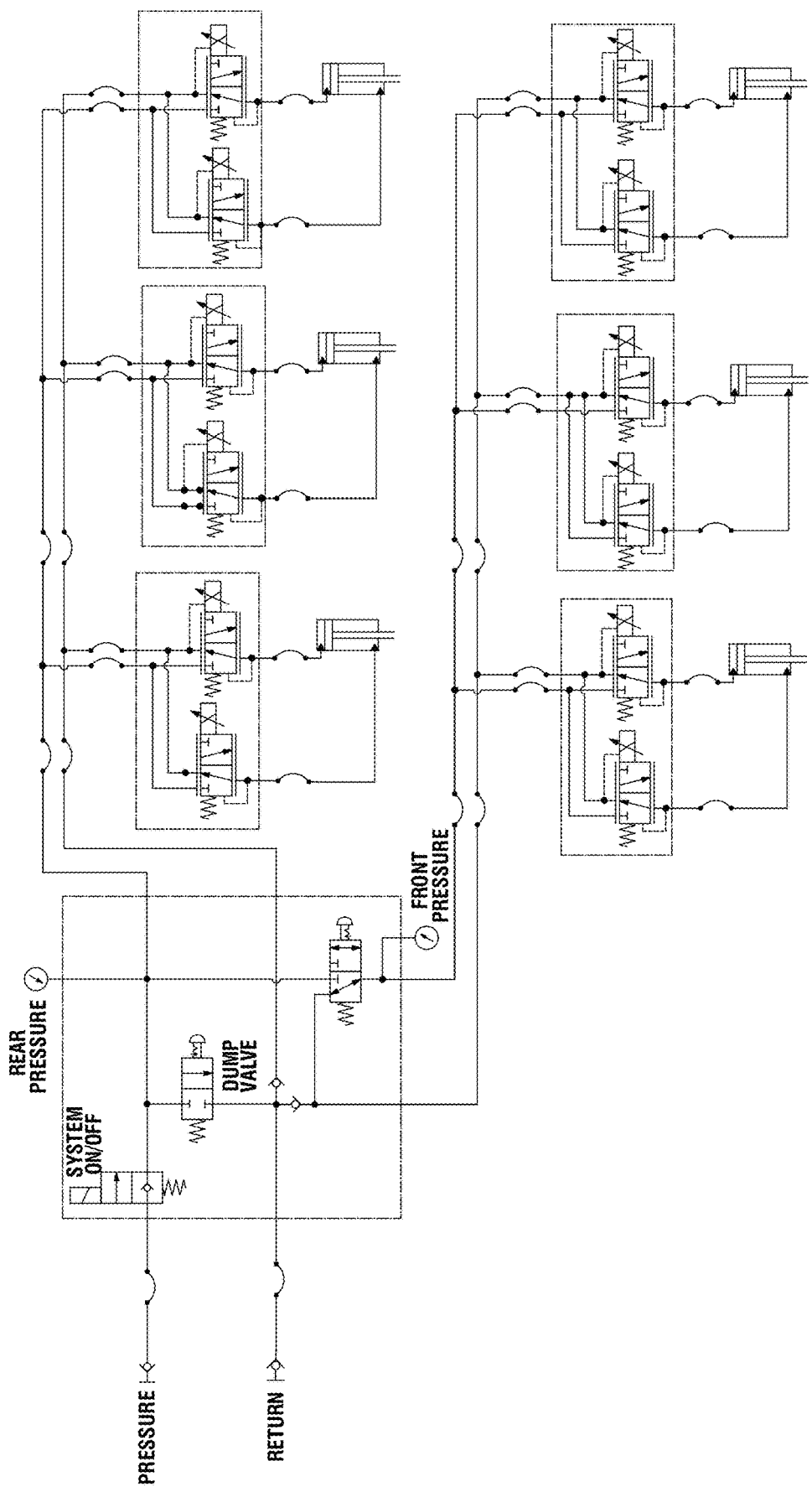
FIG. 25 is a schematic of an up and down force system showing an electronic control for the up force of each cylinder.

FIG. 25 is a schematic in which there is electronic control of the up force of the row unit assemblies. The electronic control can be in the form of a solenoid or other electrically controlled member that controls the amount of up force at each of the row units.

As disclosed herein, each row unit will include a force assembly 40. A down force valve 46a is controlled by a row-by-row basis. In addition, there may be a common up force pressure across all rows, and an up-force valve being utilized to control all of the rows thereof, as disclosed with respect to the various configurations of FIGS. 20-25. This will provide the up and/or down force as needed by the planter 10. As included herein and shown in FIG. 19, each row unit can have a down force control valve 46a and an up force control valve 46b. This is shown by the schematics of FIGS. 20, 21, 24, and 25. Furthermore, the downforce control valve 46a can include an electrically controlled solenoid, while the up force control valve can be set at system pressure and be configured such that the system pressure need to be overcome in order to impart a down force to the row unit by the assembly. This is shown in the figures of the present disclosure, which shows the inclusion of the separate down force solenoid valve 46a and the up force valve 46b.

Additional aspects may include that each row unit includes a dedicated control unit 58 or a control unit 58 that is included for a multiple of row units. For example, it is contemplated that a single control unit or box 58 controls multiple rows of a planter. As a planter includes more rows, there will be an addition of control boxes such that each box will control multiple down force assemblies of the row units. Furthermore, it is contemplated that in planting units with fewer rows, a control unit may control only two rows or that control units control any number from one to as many row units are included on a planter (e.g., 1 to N, where N=total number of rows of a planter). When the planter includes a plurality of control units, they may be electronically or wirelessly interfaced together to send to a display or interface of the operator, such that the operator is able to see the operation of each of the row units and/or each of the control units. For example, an interface may be such that an operator is able to isolate a set of rows that are being controlled by a common control unit to determine the amount of down and/or up force as being apparently applied, and to determine if there are any changes that need to be made. This may also simplify trouble shooting for the down force assemblies as there are fewer control units and thus, any issues can be isolated to the row units coupled to a selected control unit.

Still further, it is contemplated that the control unit be removed, and the system of each row unit could be connected and controlled by the tractor, such as by an operator of the tractor.

The sensor 60 can be considered a downforce sensor to determine an amount of down force being applied to or otherwise exerted on the row unit 30, such as between the gauge wheels and the ground. For example, the sensor 60 may be connected to the gauge wheels to determine a net force being applied to the gauge wheels based upon, at least in part, the weight of the row unit 30, the force being applied from the ground, and any up or down force being applied by an actuator or other device. As included herein, the amount of down force sensed by the sensor can be communicated to the control box 58, the control valve 46, or another device such as a user display in the tow vehicle, a portable computing device (tablet, phone, handheld, etc.), or even a dedicated computing member at a location remote of the planter. This sensed information can be utilized to adjust or monitor the down force being applied at a particular row unit, and can be used to make such adjustments on a row by row basis, i.e., row unit independent. The sensor 60 as shown in the figures extends generally between an arm connected to the gauge wheels and a portion of the frame 36 of the row unit 30. However, it should be appreciated that the exact configuration of sensor need not be employed in the invention, and generally any sensor capable of sensing down force on the row unit (e.g., gauge wheels) can be utilized and considered a part of the invention.

Therefore, the configuration of the down force assembly as disclosed herein provides for a divorcing of the control valve and the cylinder. The control valve and manifold are not directly connected to the cylinder, in other words are not directly coupled thereto. In addition, the manifold and control valve can be mounted and supported by the toolbar, linkage, or other portion of the planting unit, and not by the row unit itself. The control valve can be supported by the planter frame, linkage, toolbar or generally anywhere but the row unit. This provides for numerous advantages. For example, this allows for wires that do not run through the linkage arms connecting the row units to the planter frame. It reduces clutter and provides for a cleaner look and for easier manufacturing, trouble shooting, repair, and the like. This is also true for hydraulic fluids. The hydraulic hoses extending from the manifold to the cylinder can be controlled in a way such that there is cleaner look and decluttering compared to that currently disclosed in the market. Thus, the invention as disclosed herein can provide for advantages over that presently known.

Still further, it is contemplated that the up force control valve can be eliminated altogether in some instances. It is contemplated that the double acting cylinder can be reconfigured. For example, the cylinder includes a housing and a rod. The rod may include a piston within the housing, as it is known. It is contemplated that if the rod side of the piston is at system pressure, this will remove the necessity for a control valve. This system pressure will maintain an up force on the row unit by the cylinder. In order to increase the down force applied by the down force assembly 40, a hydraulic fluid will need to be applied or added to the piston side in a manner that is to overcome the system pressure on the rod side, which will impart enough force to extend the rod relative to the housing, which will impart a force which will be applied generally downward on the row unit, to increase the down force applied thereto. For example, if assuming that the tractor supplies pressure at 2,000 psi, the bore of the cylinder will be sized with respect to the rod to give the surface area that corresponds to the lift force. Therefore, this can eliminate the valve at the cylinder and can further reduce the number of components for the down force assembly as disclosed herein.

Therefore, as disclosed, a planter can include a down force assembly which can include a double acting cylinder which can impart a down or up force on the row unit of a planter relative to the planter frame. The down or up force applied thereto can be used to set and/or maintain a desired depth of furrow created by a component of the row unit and can be individually addressed for each row unit along the length of the tool bar of the planter frame. The advantages of divorcing the valve and manifold from the double acting cylinder can provide a cleaner look for decluttering components on the planter, which will reduce the complications associated with many planting implements. This will still provide the control, which can be manual or automatic for changing or else setting the amount of force applied in either an up or down manner to the row unit via the assembly and relative to the tool bar, which will provide for additional advantages.

Therefore, it is to be appreciated that, while the up and down force assembly has been shown and described herein, numerous changes and variations are to be considered part of the disclosure. For example, while the figures show various configurations and/or aspects of the up or down force assembly, it is to be appreciated that any feature of each of the figures can be utilized with any of the other figures and still be operable to provide the up and or down force to the row unit via the assembly disclosed herein. Thus, the figures themselves are not to be limiting to the exact disclosures thereof.

What is claimed is:

1. An assembly for providing up and/or down force for a row unit of an agricultural implement having a plurality of row units, the assembly comprising:
    a double acting cylinder including a first chamber on a first side of a piston and a second chamber on a rod side of the piston, wherein a bore of the cylinder is sized relative to a rod located on the rod side of the piston so as to provide an up force at a system pressure;
    a manifold in communication with said cylinder; and
    a pressure control valve coupled to the manifold and in communication with the cylinder;
    wherein the manifold and pressure control valve are divorced from the double acting cylinder.

2. The assembly of claim 1, further comprising a shutoff valve operatively connected to the second chamber each of the double acting cylinders at each of the row units to shut off the system pressure being applied to the second chambers.

3. The assembly of claim 1, wherein the control valve comprises a down force control valve for controlling the down force at the row unit, and a separate up force control valve for controlling the up force at the row unit.

4. The assembly of claim 3, wherein the down force control valve is an electrically controlled solenoid.

5. The assembly of claim 4, further comprising a shutoff valve operatively connected to the second chamber each of the double acting cylinders at each of the row units to shut off the system pressure being applied to the second chambers.

6. The assembly of claim 4, wherein the up force control valve is an electrically controlled solenoid.

7. The assembly of claim 1, wherein added pressure is applied to the first chamber to overcome the system pressure to provide downforce to the row units.

8. The assembly of claim 7, further comprising a control unit at each row unit to control the added pressure.

9. The assembly of claim 7, wherein the added pressure is controlled via a tractor.

10. An assembly for providing up and/or down force to a row unit of an agricultural planter having a plurality of row units, the assembly comprising:
    a double acting cylinder including a first chamber on a first side of a piston and a second chamber on a rod side of the piston, wherein said cylinder is configured to provide an up force at a system pressure by providing said system pressure from a system pressure source to the second chamber of the cylinder;
    a divorced manifold separate from the cylinder and in communication with said cylinder;
    a down force hose coupled directly to the first chamber from the divorced manifold; and
    a pressure control valve coupled to the divorced manifold and in communication with the cylinder to control the amount of pressure applied to the first chamber;
    wherein said divorced manifold and pressure control valve being supported by a toolbar of the agricultural implement.

11. The assembly of claim 10, further comprising a shutoff valve operatively connected to each cylinder of each of the plurality of row units, wherein the shutoff valve configured to shut off the system pressure being applied to the second chambers of each of the cylinders at the plurality of row units.

12. The assembly of claim 10, further comprising an up force control valve operatively connected to the second chamber to selectively control the amount of force applied at the second chamber.

13. The assembly of claim 12, wherein the pressure control valve and/or the up force control valve comprises an electrically controlled solenoid.

14. The assembly of claim 13, further comprising a shutoff valve operatively connected to the second chamber of the cylinder to shut off the pressure thereto.

15. The assembly of claim 12, further comprising an accumulator at the pressure control valve to receive an amount of fluid when pressure is applied at the second chamber.

16. The assembly of claim 12, further comprising a control unit at each row unit to control the added pressure.

17. A system for providing up and/or down force to a row unit of an agricultural implement, the system comprising:
    a double acting cylinder including a first chamber on a first side of a piston and a second chamber on a rod side of the piston, wherein a bore of the cylinder is sized relative to a rod located on the rod side of the piston so as to provide an up force at a system pressure;
    a manifold in communication with said cylinder; and
    a pressure control valve coupled to the manifold and in communication with the cylinder to control the amount of pressure applied to the first chamber;
    wherein the second chamber of the double acting cylinder being substantially at the system pressure to provide the up force, and added pressure being applied to the first chamber to overcome the system pressure.

18. The system of claim 17, further comprising a shutoff operatively connected to the second chamber to shutoff the system pressure thereto.

19. The system of claim 17, wherein the pressure control valve is an electrically controlled solenoid.

20. The system of claim 17, further comprising a control valve coupled to the second chamber of the cylinder to selectively provide a change in pressure thereto.

* * * * *